United States Patent
Krishnaiah

(10) Patent No.: US 11,316,844 B2
(45) Date of Patent: Apr. 26, 2022

(54) OPTIMIZING TOKENS FOR IDENTITY PLATFORMS

(71) Applicant: PAYPAL, INC., San Jose, CA (US)

(72) Inventor: Akshay Sanjeevaiah Krishnaiah, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1150 days.

(21) Appl. No.: 14/979,866

(22) Filed: Dec. 28, 2015

(65) Prior Publication Data

US 2017/0063840 A1 Mar. 2, 2017

Related U.S. Application Data

(60) Provisional application No. 62/208,885, filed on Aug. 24, 2015.

(51) Int. Cl.
*H04L 29/06* (2006.01)
*G06Q 20/36* (2012.01)
*G06Q 20/40* (2012.01)

(52) U.S. Cl.
CPC ..... *H04L 63/0815* (2013.01); *G06Q 20/3674* (2013.01); *G06Q 20/4014* (2013.01); *H04L 63/0861* (2013.01); *G06Q 2220/00* (2013.01)

(58) Field of Classification Search
CPC ............ H04L 63/0815; H04L 63/0861; G06Q 20/3674; G06Q 20/4014; G06Q 2220/00
USPC ........................................................ 705/67
See application file for complete search history.

(56) References Cited

U.S. PATENT DOCUMENTS

| 6,523,041 | B1* | 2/2003 | Morgan | G06Q 30/02 |
| 8,131,745 | B1* | 3/2012 | Hoffman | G06Q 10/107 |
| | | | | 707/766 |
| 8,171,531 | B2* | 5/2012 | Buer | G06F 21/34 |
| | | | | 380/277 |
| 8,275,995 | B2* | 9/2012 | Jobmann | H04L 9/0866 |
| | | | | 713/186 |
| 8,316,389 | B2* | 11/2012 | Wong | H04N 5/44543 |
| | | | | 725/24 |

(Continued)

OTHER PUBLICATIONS

Joseph Bonneau, Cormac Herley, Paul C. van Oorschot, Frank Stajano; "The quest to replace passwords: a framework for comparative evaluation of Web authentication schemes", Mar. 2012, UCAM Computer Laboratory; document UCAM-CL-TR-817.pdf (Year: 2012).*

(Continued)

*Primary Examiner* — John W Hayes
*Assistant Examiner* — Edgar R Martinez-Hernandez
(74) *Attorney, Agent, or Firm* — Haynes and Boone, LLP

(57) ABSTRACT

The present disclosure is directed to generating cross-platform electronic tokens. First information of a first user associated with a first identity platform is accessed. Second information of a second user associated with a second identity platform is accessed. The second identity platform is different from the first identity platform. The first information and the second information are analyzed to determine whether the first user and the second user are the same person. In response to a determination that the first user and the second user are the same person, a cross-platform electronic token is generated to be used for both the first identity platform and the second identity platform.

20 Claims, 8 Drawing Sheets

(56) References Cited

U.S. PATENT DOCUMENTS

| | | | | |
|---|---|---|---|---|
| 8,327,141 B2* | 12/2012 | Vysogorets | ............ | G06F 21/34 713/168 |
| 8,819,795 B2* | 8/2014 | Hitchcock | ............... | G06F 21/41 726/17 |
| 8,826,019 B2* | 9/2014 | Shablygin | ............... | G06F 21/34 713/168 |
| 8,831,994 B1* | 9/2014 | Hoffman | ............. | G06F 21/6218 705/50 |
| 10,853,773 B2* | 12/2020 | Feder | ................. | G06Q 20/3223 |
| 2003/0229783 A1* | 12/2003 | Hardt | ....................... | G06F 21/33 713/155 |
| 2004/0139028 A1* | 7/2004 | Fishman | ............. | G06Q 20/341 705/67 |
| 2007/0143851 A1* | 6/2007 | Nicodemus | ......... | G06F 11/3495 726/25 |
| 2010/0057586 A1* | 3/2010 | Chow | ..................... | G01S 19/14 705/26.1 |
| 2011/0125613 A1* | 5/2011 | Franchi | ................... | G06F 21/32 705/27.1 |
| 2012/0310829 A1* | 12/2012 | Paulsen | .............. | H04L 63/0815 705/44 |
| 2012/0331516 A1* | 12/2012 | Perez Martinez | .. | H04L 63/0245 726/1 |
| 2013/0042110 A1* | 2/2013 | Shablygin | ............... | G06F 21/34 713/168 |
| 2013/0332344 A1* | 12/2013 | Weber | ................... | G06Q 20/38 705/39 |
| 2014/0047233 A1* | 2/2014 | Kalin | .................... | H04L 63/083 713/155 |
| 2014/0129450 A1* | 5/2014 | Priebatsch | .......... | G06Q 20/322 705/44 |
| 2015/0172261 A1* | 6/2015 | Counterman | ....... | H04L 63/0815 726/7 |
| 2015/0180868 A1* | 6/2015 | Sng | ..................... | H04L 63/0884 726/9 |
| 2015/0221153 A1* | 8/2015 | Dashiff | ................. | G07C 13/00 705/12 |
| 2016/0028550 A1* | 1/2016 | Gaddam | ............... | H04L 9/3215 713/173 |
| 2016/0162903 A1* | 6/2016 | Weiss | ................. | G06F 21/6245 705/72 |
| 2017/0011393 A1* | 1/2017 | Hong | ..................... | G06F 21/31 |
| 2017/0255942 A1* | 9/2017 | Chandrasekaran | ..... | G06F 21/32 |

OTHER PUBLICATIONS

Stig Frode Mjølsnes, Chunming Rong; "On-Line E-Wallet System with Decentralized Credential Keepers", 2003, Kluwer Academic Publishers; document OnLineEwalletSystem.pdf (Year: 2003).*

"A Cross-platform Mobile Payment Solution Based on Web Technology.pdf"; Zhijie Qiu, Lei Luo, Jianchao Luo; (Year: 2012).*

* cited by examiner

OPTIMIZING TOKENS FOR IDENTITY PLATFORMS

CLAIM OF PRIORITY

The present application is a utility patent application of provisional U.S. Patent Application No. 62/208,885, filed on Aug. 24, 2015, entitled "Optimizing Tokens for Identity Platforms", the disclosure of which is hereby incorporated by reference in its entirety.

BACKGROUND

Field of the Invention

The present invention generally relates to systems and methods for optimizing tokens for identity platforms.

Related Art

With the popularity of cross channel commerce (omnichannel), many payments are made across different channels (online, offline, mobile etc.). As the payment industry looks to a more secured method of transactions, tokenization has been implemented to protect end users' confidential financial information. However, there is a financial cost related to generating tokens. Currently, a different token needs to be generated for each identity platform (e.g., Facebook®, Microsoft®, Google®, Pinterest®, etc.), even if the end user is the same. This may become costly for the entity that is paying for the token generation.

Therefore, although existing systems and methods of tokenization are generally adequate for their intended purposes, they have not been entirely satisfactory in every aspect. What is needed is an optimized tokenization scheme where the same token can be used across different identity platforms for the same end user.

Figure 1:
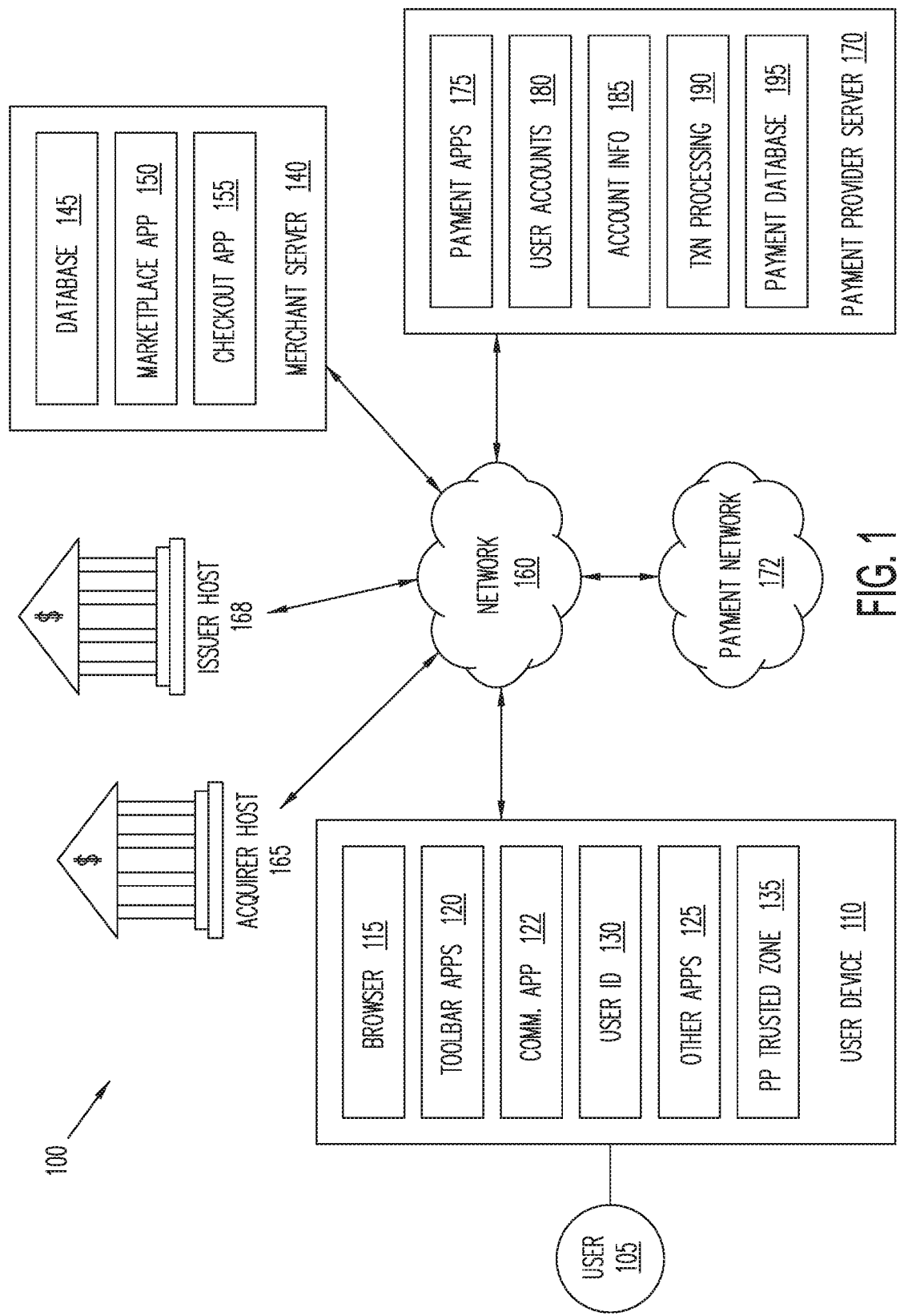
FIG. 1 is block diagram of a networked system suitable for implementing a cross-platform tokenization scheme according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As payment technologies continue to evolve, particularly with the rise of mobile payments in recent years, data security has become more important than ever. As a result, an approach known as tokenization has been employed in order to protect consumers' sensitive financial and/or personal information. In more detail, when a consumer makes a payment, instead of submitting the consumer's sensitive financial information such as a real credit card number, an electronic "token" (hereinafter referred to as token for reasons of simplicity) is generated to serve as a proxy for the real credit card number. The token may be generated from random numbers but may appear and function as an equivalent to the real credit card number. If the token is compromised (e.g., intercepted by a hacker), it would not otherwise affect the consumer's real credit card number, since a different token may be generated the next time the consumer makes a payment. In this manner, tokenization can safeguard the consumer's sensitive information. Due to these benefits, various tokenization schemes or standards such as the EMV (Europay®, Mastercard®, and Visa®) tokenization standard have been steadily gaining adoption in the marketplace.

However, the generation of tokens still incurs a financial cost, however small that may be for each individual token. This situation is compounded when a consumer has accounts with a plurality of identity platforms (e.g., Facebook®, Google®, Microsoft®, etc.), where a financial transaction may be made through each identity platform. Conventionally, unique tokens would be generated for each identity platform, which means the entity that bears the cost for the token generation would have to pay for the token generation multiple times, even if the underlying consumer (for which the tokens are generated) is the same. This may become costly for the entity paying for the token generation, and it is wasteful. Therefore, the present disclosure proposes an optimized cross-platform tokenization scheme. According to the optimized cross-platform tokenization scheme, after verifying that multiple users from different identity platforms are really the same consumer, only one unique token that is platform-agnostic will be generated and used across multiple identity platforms. This will now be discussed in more detail below with reference to FIGS. 1-7.

FIG. 1 is block diagram of a networked system suitable for implementing the optimized tokens according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc, wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider. In particular, the payment application may authenticate user 105 before making payments. In an embodiment, the payment application may implement automatic authentication of the user 105 when the user 105 is at certain payment locations. The payment application in conjunction with the payment service provider may also provide proxies for user's credentials and funding instrument (e.g., payment and identity proxies for transaction) within secure zone 135 to be used with/without further authentication with payment service provider depending on the transaction or payment situation. The payment application may also receive relevant payment and identity proxies from proximity based ancillary systems such as a Bluetooth beacon installed in the merchant's premises in association with the payment service provider for the purpose of processing transactions or providing value added services to the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

In some embodiments, the merchant server 140 is a part of, or is maintained by, an identity platform. An identity platform is a platform on which a consumer can establish and maintain an identity. The consumer's identity may include, but is not limited to, the consumer's real name, shipping address, billing address, phone number(s), email address, account username, account password, account settings or preferences, funding instrument information (e.g., credit card number, debit card number, checking or savings account information), etc. At least some of the identity information of the user may be sensitive in nature and should be protected. In some embodiments, the identity platforms may include a social network, such as Facebook®, Google® (e.g., via Google Plus®), YouTube®, Twitter®, Pinterest®, etc. In other embodiments, the identity platforms may include a hardware/software company such as Apple®, Microsoft®, Sony®, etc. In yet other embodiments, the identity platforms may include traditional retailers such as Macy's®, Sear's®, Walmart®, etc. Thus, an identity platform may be part of or managed by a merchant or merchant server or separate from the merchant or merchant server.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used. In some embodiments, an identity platform may be managed by or be part of a payment provider service, such as payment provider server 170, or be a separate entity or service provider that manages identity.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may include a token vault storing various information on token formats, conventions, data, and the like. For example, a token may be generated for a user's payment account to allow payment transactions using the token. A user's identity information, preferences, or other information may be stored and associated with the user's account and mapped to tokens. Merchant accounts at the payment provider server 170 also may store merchant's information, such as type of merchant, product or service offered, method of payments, and the like to ensure diversified use of tokens that may vary by merchant type/service etc.

Payment network 172 may be operated by payment card service providers or card associations, such as DISCOVER, VISA, MASTERCARD, AMERICAN EXPRESS, RuPAY, China Union Pay, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

As discussed above, traditional tokenization schemes may require unique tokens to be generated for transactions involving each identity platform. For example, a hypothetical user John Doe may have an account with each of the following identity platforms: Facebook®, Apple®, Google®, and Microsoft®. Under the conventional tokenization approach, a token 1 is generated for John Doe's transactions via Facebook®, a token 2 is generated for John Doe's transactions via Apple®, a token 3 is generated for John Doe's transactions via Google®, and a token 4 is generated for John Doe's transactions via Microsoft®. These tokens are unique and different from each other, because as far as the token generation entity is concerned, the transactions that led to the token generation may come from different users, even though in reality they all came from the same person—John Doe. Generating multiple tokens for the same person is financially wasteful, since the generation of each token has a certain cost. Therefore, the entity paying for the token generation incurs unnecessary costs for the extra tokens generated.

According to the various aspects of the present disclosure, the payment provider server 170 may implement an identity engine to determine whether users from different identity platforms are really the same underlying person. Once multiple users from different identity platforms have been determined to be the same person, then a single unique platform-agnostic token is generated and sent to these different identity platforms to facilitate the various transactions on these different identity platforms. This token is referred to as a cross-platform token.

Figure 2:
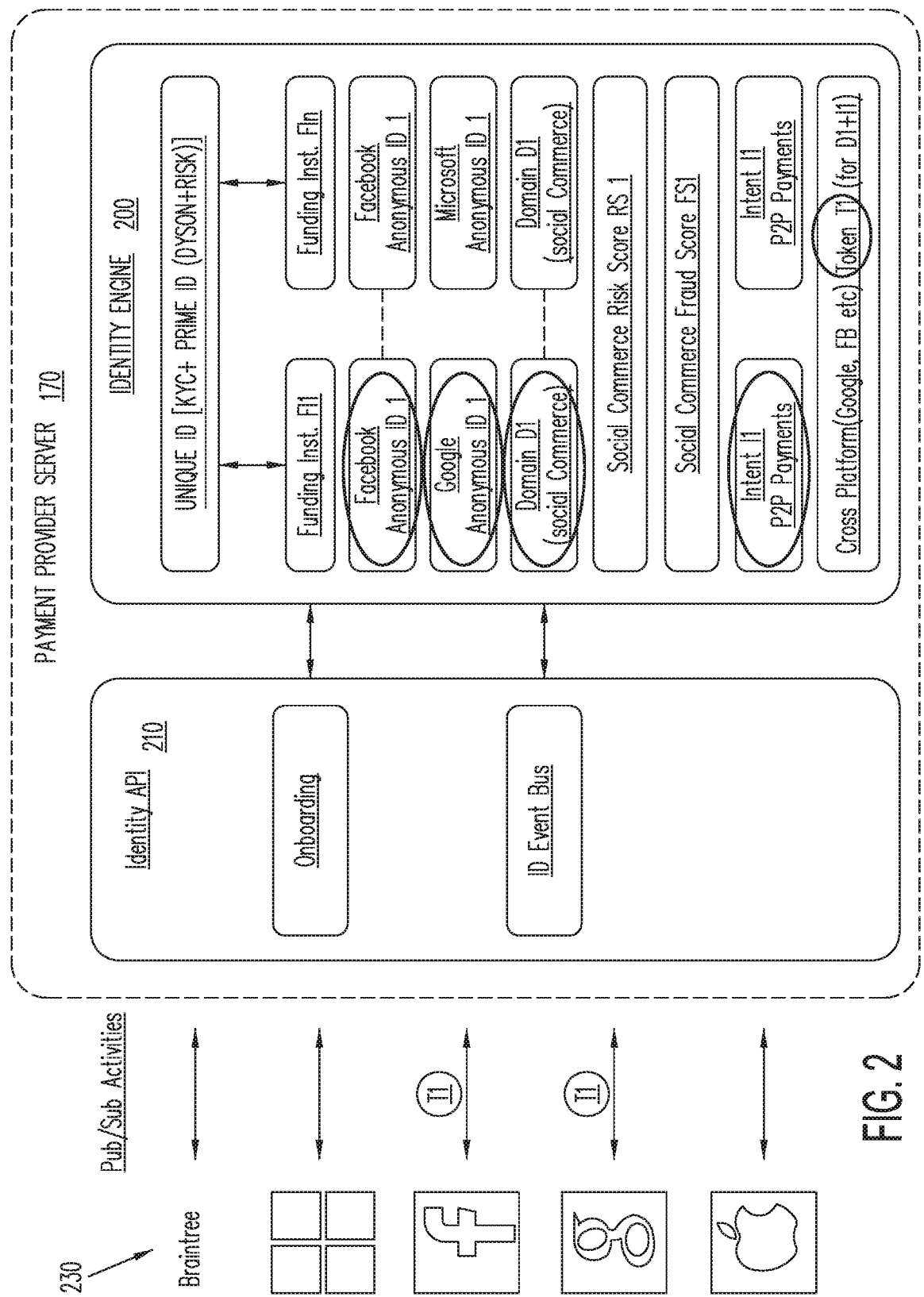
FIG. 2 is a diagram illustrating an identity engine for implementing the cross-platform tokenization according to various aspects of the present disclosure.

FIG. 2 illustrates a simplified block diagram of the cross-platform tokenization approach of the present disclosure. The payment provider server 170 includes an identity engine 200 and an identity API (Application Program Interface) module 210. A plurality of identity platforms 230 are in communication with the payment provider server 170 via the API module 210. The identity platforms 230 shown in FIG. 2 are merely examples and include Braintree®, Microsoft®, Facebook®, Google®, and Apple®. The identity platforms 230 may be communicating with the payment provider 170 to facilitate transactions such as financial purchases made by their respective users.

As a part of such communication, the identity platforms 230 may be sending the user's information as well as information regarding the transaction to the payment provider server 170. For example, such information may include publish/subscribe based industry standard services/activities. The publish services may include, but are not limited to: credit card information or other financial instruments, anonymous platform ID (e.g., username), domain of transaction, intent of transaction, fraudulent activities, account takeovers, ID changes, etc. The subscribe services may include, but are not limited to: getting tokens from platform IDs, getting token updates, getting relevant transaction updates, getting token blacklisting updates, getting issuer updates, etc.

The payment provider server 170 uses the identity engine 200 to analyze the information received from the identity platforms 230 to determine whether two or more of the users from different identity platforms 230 are actually the same person. In some embodiments, as a part of its analysis, the identity engine 200 may compare the information submitted from different identity platforms corresponding to different users to see what information, if any, is common in both identity platforms. For example, a user 1 from Microsoft® may have an anonymous username ABC123, a user 2 from Facebook® may have an anonymous username DEF456, a user 3 from Google® may also have an anonymous username DEF456, and a user 4 from Apple® may have an anonymous username GHI789. The comparison of the usernames indicates that the user 2 from Facebook® and the user 3 from Google® have the same username (DEF456), and as such they are likely the same actual person. Users 1 and 4 have different usernames from each other and from users 2 and 3, and as such they may be different persons.

As another example, funding instrument information may also be analyzed by the identity engine 200. The user 1 from Microsoft® may have a Mastercard® from Citi Bank® as its funding instrument, the user 2 from Facebook® may have a VISA® card from JP Morgan Chase® as its funding instrument, the user 3 from Google® may also have a VISA® card from JP Morgan Chase® as its funding instrument, and the user 4 from Apple® may have an iTunes® gift card as its funding instrument. The comparison of the different funding instruments from different users on different identity platforms indicates that, once again, the user 2 from Facebook® and the user 3 from Google® have the same funding instrument (VISA® card from JP Morgan Chase®), and as such they could be the same actual person. Users 1 and 4 have different funding instruments from each other and from users 2 and 3, and as such they may be different persons. It is understood that in some embodiments, the funding instrument information may contain more specificity, such as partial or full credit card numbers of checking/savings account numbers. In those embodiments, the comparison of the funding instrument information may include comparing the specific partial or full credit numbers of checking/savings account numbers from different users on different identity platforms.

As yet another example, the domain of a transaction may also be compared. As examples, domains may include, but are not limited to: social commerce, operating system, physical marketplaces, virtual marketplaces, transportation, entertainment, etc. In an example, the transaction corresponding to user 1 from Microsoft® may be operating system related (e.g., a renewal request for subscription of Windows 8), the transaction corresponding to user 2 from Facebook® may be for a social commerce transaction (e.g., a purchase relating to a Web App), the transaction corresponding to user 3 from Google® may also be a social commerce transaction (e.g., a purchase relating to a mobile App), and the transaction corresponding to user 4 from Apple® may be for an Apple® product (e.g., an iPhone®). The comparison of the different domains of the transactions corresponding to different users on different identity platforms indicates that the transactions corresponding to user 2 from Facebook® and the user 3 from Google® have the same domain (social commerce), and as such users 2 and 3 could be the same actual person. Transactions corresponding to users 1 and 4 have different domains from each other and from users 2 and 3, and as such users 1 and 4 may be different persons.

As a further example, the intent of a transaction may also be compared. As examples, the intents may include, but are not limited to: person-to-person (P2P) payment, in-app purchases, etc. It is understood that different users from different identity platforms may have similar domains but different intents, or vice versa. In an example, the intent of the transaction corresponding to user 1 from Microsoft® may to pay a third party company, the intent of the transaction corresponding to user 2 from Facebook® may be a person-to-person (P2P) payment, the intent of the transaction corresponding to user 3 from Google® may also be a P2P payment, and intent of transaction corresponding to user 4 from Apple® may be to pay the identity platform directly. The comparison of the intent of payment of the transactions corresponding to different users on different identity platforms indicates that the transactions corresponding to user 2 from Facebook® and the user 3 from Google® have the same intent, and as such the users 2 and 3 may be the same actual person. Transactions corresponding to users 1 and 4 have different intents from each other and from users 2 and 3, and as such users 1 and 4 may be different persons.

These examples above are merely a subset of the types of information that can be analyzed to determine whether or not multiple users are really the same person. Other types of information that can be analyzed in this regard may include, but are not limited to, a residential address or shipping address of the user, an email address of the user, a phone number of the user, an employer of the user, an occupation of the user, a birthdate of the user, a birth place of the user, the citizenship of the user, an age of the user, a credit score of the user, a credit history of the user, a school attended by the user, relatives of the user, a hobby of the user, an IP (Internet Protocol) address of a user device (that is giving rise to the transaction from the particular identity platform), a MAC (Media Access Control) address of the user device, a UUID (Universally Unique Identifier) of the user device, an Internet browser type, a UDID (Unique Device Identifier), a screen resolution of the user device, or even biometric information such as fingerprints, heart rate, blood pressure, etc. Of course, not all identity platforms will contain all of these types of information listed above, but the identity engine 200 may analyze whatever types of information that are common in multiple identity platforms.

In some embodiments, an overall match score is calculated after all the possible or desired comparisons are performed for the available types of information. For each comparison, a sub-score may be generated, and all the sub-scores may be added up to obtain the overall match score. For example, if the comparisons only include the four examples discussed above—username, funding instrument, domain of transaction, and intent of transaction—then the comparison of each type of information may make up a sub-score. The sub-scores are not necessarily assigned to have equal weight. For example, the sub-score corresponding to the matching of the usernames may have a heavier weight (e.g., 50) than the sub-score corresponding to the domain of transaction (e.g., 15). The sub-scores are added up to calculate the overall match score (e.g., 100), where a higher overall match score indicates a higher likelihood that the users are the same person.

It is understood that the calculation of each sub-score may not be binary. In other words, it is not necessarily an "all-or-nothing" calculation. In some embodiments, a portion of the sub-score may be given if there is a partial match between the information from different users. The closer the match, the higher the sub-score. For example, suppose that the maximum sub-score for matching the usernames is 50, which requires an identical match. A partial match between the usernames may yield a sub-score less than 50. To illustrate, suppose user 1 has a username that is "Basketball_Lover_23", user 2 also has a username that is "Basketball_Lover_23", user 3 has a username that is "BasketballLover23", and user 4 has a username that is "KingSlayer." In this example, user 1 and user 2 have identical usernames, and thus the sub-score for a username match between user 1 and user 2 may be a perfect 50 out of 50. The username for user 3 is similar to that of user 1 or user 2, and thus the username matching score between user 3 and user 1 or user 2 is less than 50 but is greater than 0, for example 25. The username for user 4 is completely different than that of user 1, user 2, or user 3. As such, the username matching between user 4 and any of the other users is 0. In some embodiments, correlation or autocorrelation algorithms may be executed by the identity engine to determine how well the usernames match one another.

In some embodiments, the identity engine 200 may specify a threshold score that must be exceeded for the different users from different identity platforms to be considered the same actual person. For example, suppose that the threshold has been set to be 60, and also suppose that the overall match score between user 1 (from Microsoft®) and user 2 (from Facebook®) may be 0, the overall match score between user 2 (from Facebook®) and user 3 (from Google®) may be 100, and the overall match score between user 3 (from Google®) and user 4 (from Apple®) may be 10.

In that case, the identity engine 200 may determine that user 2 and user 3 are really the same actual person, while user 1 and user 4 are separate persons, and neither user 1 nor user 4 is the same person as the person corresponding to user 2 or user 3. This is because the overall matching score between user 2 and user 3 exceeds the threshold score (100>60), while the overall matching score between user 1 and 2 or between user 3 and user 4 does not meet the threshold (0<60, and 10<60).

In some embodiments, all the user-related information extracted from a given identity platform may be compiled into a user profile, also referred to as a unique ID. The unique IDs corresponding to different users from different identity platforms may be analyzed and/or compared by the identity engine 200 to determine if two or more users are really the same actual person. Of course, this analysis or comparison of the different unique IDs may or may not include the process(es) of generating/calculating the various scores as discussed above.

In some embodiments, the identity engine may also assess a risk score or a fraud score of the transaction. For example, if different users from different identity platforms each have a good credit score or good credit history, or if the value of the transaction is low, the risk score may be low. In that case, the identity engine 200 may require less strict matching of the information from different users to "determine" that the different users are the same person. Conversely, if one or more of the users have a low credit score or poor credit history, or if the value of the transaction is high, the risk score may be high. In that case, the identity engine 200 may enforce stricter matching requirements before "determining" that the different users are the same person. The fraud score may share certain similarities with the risk score but may be different in other aspects. For example, the fraud score may pertain to whether one or more of the users' account(s) have had an account takeover or have suffered identity theft, or whether the proposed transaction is in an area of commerce whether fraud is prevalent. It is understood that the risk score or fraud score may be set at the "domain" level discussed above, or at the "intent" level discussed above.

Figure 3:
FIG. 3 is a diagram illustrating a method of analyzing data gathered from identity platforms according to various aspects of the present disclosure.

Referring to FIG. 3, a multi-step approach may be used to determine whether different users from different identity platforms are the same person according to an embodiment of the present disclosure. At an "events" step, all events of each identity platform (e.g., Facebook® or Microsoft®) are aggregated into "sessions". At a subsequent "sessions" step, several analytic methods are used to connect between the related sessions and aggregate them into the "same person." In the "same person" step, the "same person" chain is comprised of all the sessions and events that were related to the same user. As many sessions as possible are connected into the lowest number of persons. At the "tagging" step, a holistic tagging decision is made for each "same person" chain, in order to decide whether it is the user or not. The tagging is then propagated both upwards (e.g., account level) and downwards (e.g., sessions, assets). At the "analytics" step, after a full data source of tagged sessions, events, and "same person" chains is created, the data can be analyzed and used for decision making and research before issuing tokens. The analytics may include factors such as:

did the account ever suffer an account takeover (ATO)
is it in good standing
does it have trusted email, address, phone, or other user related information
fraud score
credit card number or bank identification number
geolocation The analytics will help the identity engine 200 determine whether users from different identity platforms are actually the same underlying person.

Referring now back to FIG. 2, regardless of the particular methodologies used to determine that multiple users from different identity platforms are the same actual person, once that determination is made, the payment provider server 170 generates a cross-platform token that is used to facilitate the transactions for the user from each of the multiple identity platforms. For example, if user 2 from Facebook® and user 3 from Google® have been determined to be the same actual person, then a cross-platform token (e.g., T1) may be generated for both of the users, even though they are from different identity platforms.

Using the same token for user 2 and user 3 does not increase risk of the transactions, because the users 2 and 3 are the same person. In other words, there is no risk of divulging sensitive information to another person. Meanwhile, using a single token for both user 2 and user 3 (and their respective transactions on different identity platforms) reduces cost, since only one token needs to be generated instead of two. In actual practice, more than two users may be determined to be the same person, especially as social networking sites and online marketplaces continue to proliferate, which leads to the same person having more and more accounts. The more users from different identity platforms can be consolidated to the same actual person, the more financial cost can be reduced by having a single cross-platform token for the users from all of these identity platforms. In this manner, the present disclosure optimizes the conventional tokenization scheme.

Still referring to FIG. 2, the payment provider server 170 also communicates with the identity platforms 230 to safeguard against fraud. In more detail, the identity platforms 230 will publish activities or services to the payment provider server 170 via the identity API module 210. If fraud has been detected by a particular identity platform 230 (e.g., account takeovers, data breach, or other hacking related activities), where a user's sensitive information could have been compromised, the identity platform 230 will include these activities in its publication to the payment provider server 170. When the payment provider server 170 is notified via the identity API 210, the identity engine 200 will automatically change or replace all the previously issued tokens to that identity platform without the end user (e.g., the user on the identity platform that has been breached) having to manually change his or her account information. In other words, the end user need not change all of his/her funding instrument information, because the new tokens from the payment provider server 170 will take care of that. Since the tokens are cross-platform, the payment provider server 170 will send the tokens to other identity platforms where the user also has an account. In addition, the identity engine 200 will also blacklist the old tokens, so that if the old tokens are ever attempted to be used, the transactions will be denied.

Figure 4A:
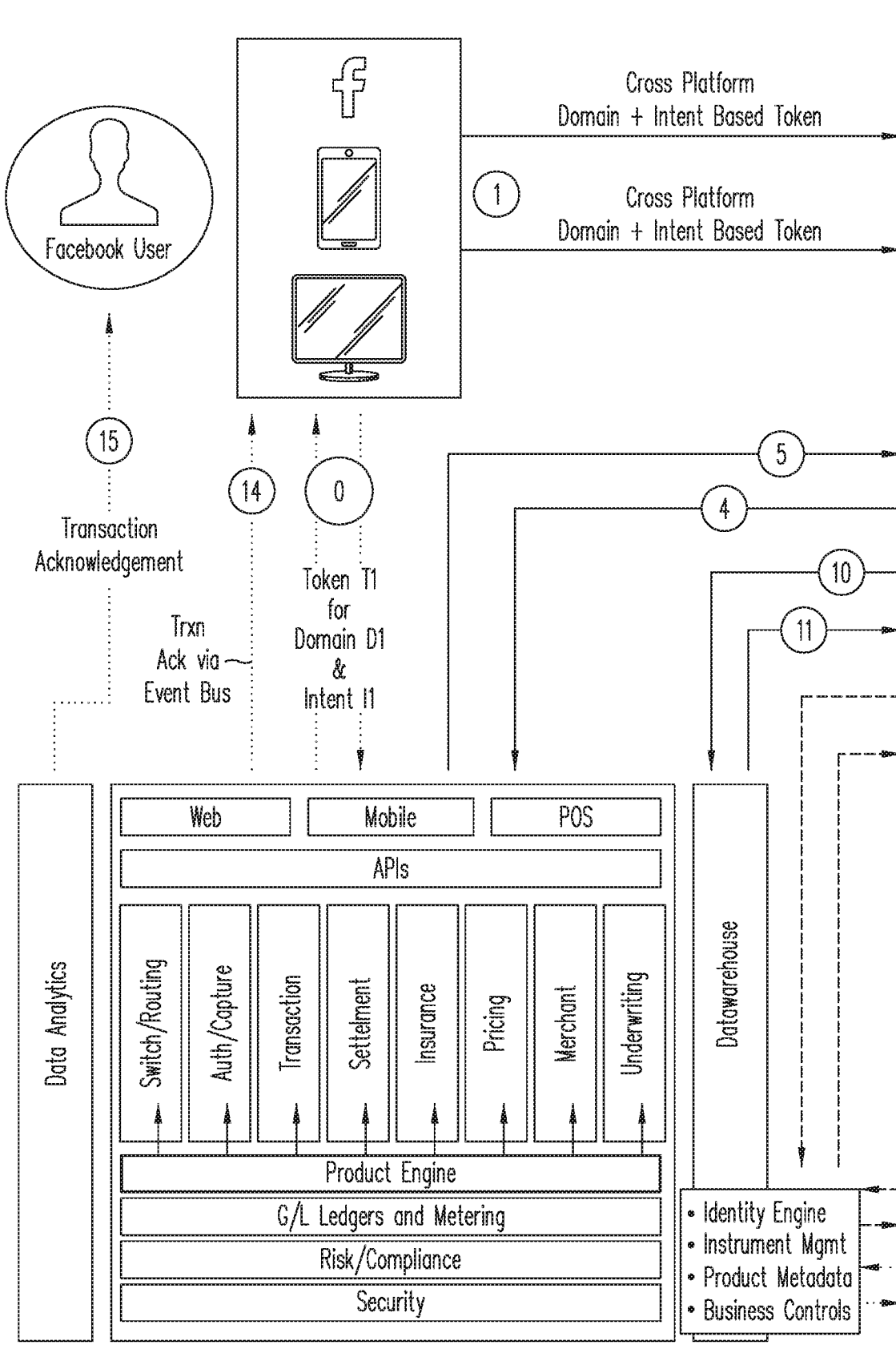
FIGS. 4A and 4B are a diagram that visually illustrates the various processes for implementing the cross-platform tokenization according to various aspects of the present disclosure.
Figure 4B:
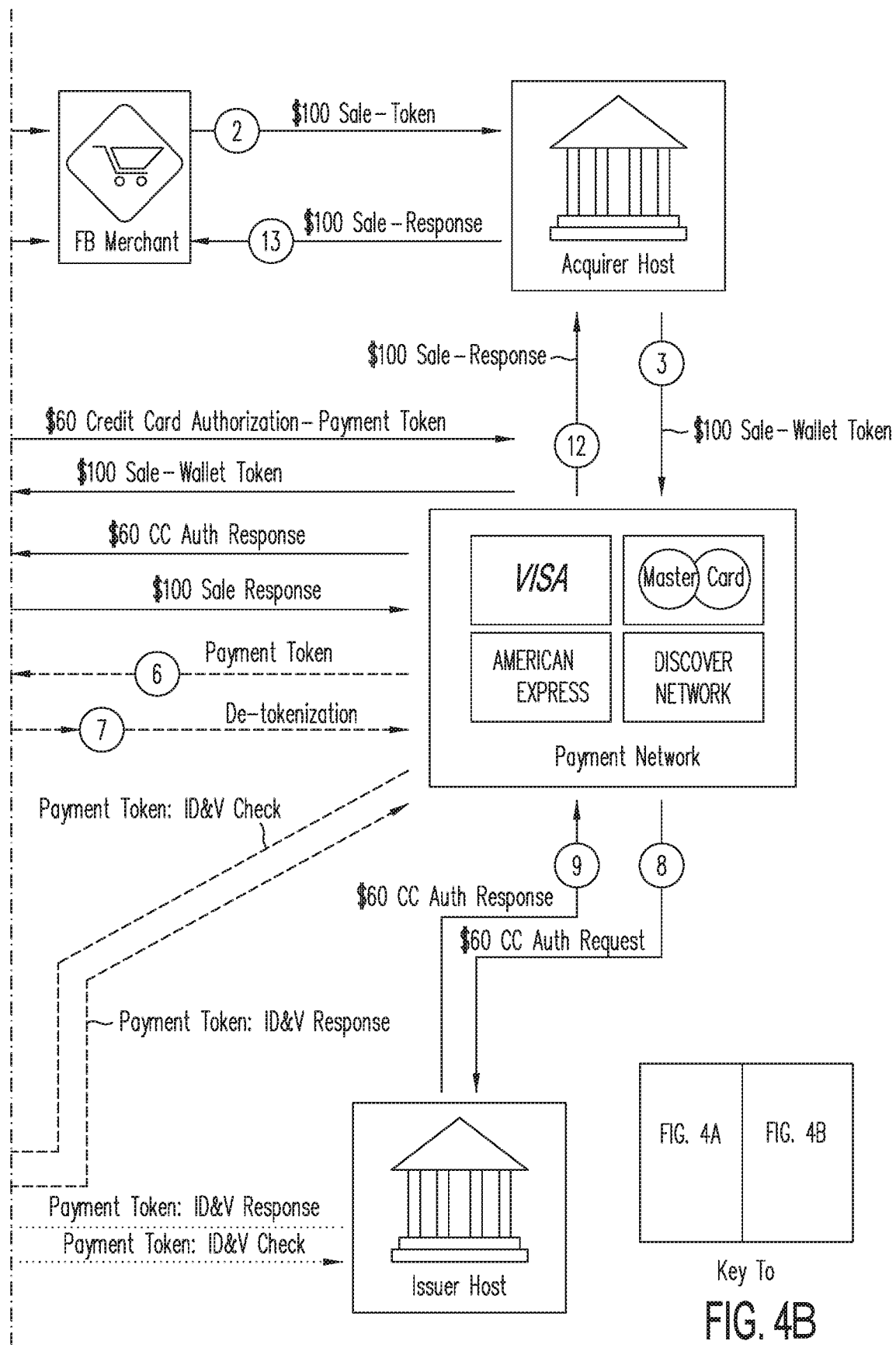

FIG. 4 is a flowchart showing various processes for implementing the optimized cross-platform tokenization scheme according to one embodiment of the present disclosure. Initially, backend processes may be performed at the payment service provider 170, e.g., PayPal, Inc. In some embodiments, the payment service provider 170 may include the token service provider. In particular, an assurance process is performed to request assurance, such as confirmation of user data and credentials, for funding instrument and users from the issuer, the payment network, or both. The token service provider may receive assurance from the issuer, the payment network, or both. In response to receiving assurance, the token service provider may generate and assign payment tokens to funding sources. In some embodiments, a funding source may be assigned with multiple payment tokens.

At step 0, a cross-platform token T1 is generated. The cross-platform token T1 is generated for a domain D1 and for an intent I1. The token T1 may be generated from random numbers and exist in software, or it may be hard-coded in a payment card in some embodiments, for example a payment card configured to implement payment via MSR, EMV, or NFC. The token T1 may be generated for a mobile device or a desktop/laptop device.

The term "token" may refer to a proxy for a user's payment account, such as a payment provider user account, e.g., a 8 to 19-digit numeric value which passes basic validation rules of an account number along with discretionary data in industry standard track 1 and track 2 formats that may have information pertaining to additional value added services such as identity assurance, loyalty, Internet of Things (IoT), etc. Tokens may be generated within a BIN/IIN range that has been designated as a token BIN/IIN range and flagged accordingly in all appropriate BIN/IIN tables.

In some embodiments, a token may be hard coded onto a physical payment card, such as a payment provider branded card. The token may be used in any format offline e.g. magnetic stripe reader, EMV or NFC. The validity of the tokens may be set in real time or at an account level via a backend policy applied on the BIN/IIN.

At step 1, a user (e.g., a Facebook® user) may pass the cross-platform token—which is also domain-based and intent-based—to a merchant (e.g., a Facebook® merchant) or other entity to process a transaction. For example, the user may pass the token to the merchant for a $100 sale via various types of transaction instruments, such as a payment card, a mobile device, a desktop device, a wearable device, and the like, via various channels, such as NFC, BLE, PayCode, check in, MSR, EMV, and the like.

At step 2, the merchant may then pass the cross-platform token received at the point of sale (POS) to the acquirer host along with transaction information, such as the product or service purchased, the amount of purchase ($100), location, time, date of purchase, and any other information related to the purchase.

At step 3, the acquirer host then may process the information and pass the cross-platform token along with the transaction information to the appropriate payment network. As examples, the payment network may include entities such as VISA, Mastercard®, American Express®, or Discover®.

At step 4, the payment network may further process the cross-platform token. The payment network may determine that the cross-platform token was generated from the payment service provider, e.g., PayPal. The payment network then sends the cross-platform token back to the payment service provider for a $100 authorization.

At step 5, based on the funding instruments designated at the user's payment account, e.g., PayPal account, and the payment account balance of the user at the payment service provider, the payment service provider may send the appropriate authorization that needs to be sent to the issuer of the funding instrument along with payment token for the funding instrument. For example, the user may have $40 balance in the payment account at the payment service provider to be used for the $100 purchase. $60 is still needed to complete the purchase. As such, the payment service provider may send the authorization that needs to be sent to the issuer, e.g., authorization for $60.

At step 6, the payment network may receive the payment token from the payment service provider and may realize that this is a payment token from the payment service provider, e.g., PayPal, and may send the payment token back to payment service provider's token service provider for de-tokenization.

At step 7, the payment service provider may process a payment token via a suitable data transmission protocol or connection based on the relevant payment network making the connection. The payment service provider may then send the appropriate de-tokenized information relevant to the non-payment provider funding instrument (in this case $60 for credit card on file).

At step 8, the payment networks may receive the de-tokenized information for the non-payment provider funding instrument on file and may send it to the issuer host via an authentication transaction.

At step 9, the issuer host may review the PAN information and sends an authorization (for the $60 credit card transaction) success call or message to the payment network.

At step 10, the payment network may send the $60 authorization success back to the payment service provider, e.g., PayPal, via the established connection.

At step 11, the payment service provider may process this information and may respond with a $100 authorization success call or message to the payment network.

At step 12, the payment network may send this $100 authorization success message back to the acquirer host.

At step 13, the acquirer host may send the $100 authorization success message back to the merchant's POS allowing the retail associate to complete the transaction in the case of offline transaction or provide a success message to the user in the case of online transaction.

At step 14, the payment service provider, e.g., PayPal, may send a notification (email/in-app) to the user that transaction has successfully been completed. In other words, the transaction is acknowledged, which may be done via an event bus.

It is understood that a cross-platform token provider, such as PayPal, Inc., may implement various aspects of cross-platform token generation. In an embodiment, the token provider may generate or create tokens based on the transaction channel such as online or mobile or in-store or actions performed by the user. For example, the transactions may be financial transactions, such as payments for a purchase, fund transfers, and the like. The transactions may be non-financial transactions, such as checking into a hotel, sharing value added information, such as medical information (allergy), preferences (room preference for hotels), signing up for a membership account, and the like. The tokens may include identity information of the user that is relevant to the type of transaction being implemented by the user. For example, user's preferences, user's healthcare records, user's age, user's address, user's affiliations, user's loyalty programs, social networking account, and the like may be included with the token to help facilitate the transactions. In an example, if the transaction is related to user's healthcare, such as checking in at a doctor's office, the token may include the user's insurance card/ID information that can be used to pre-calculate co-pays and also signal required pre-checks and other actions to the user while notifying medical authorities about a patient's payment and health history to provide relevant services. In another example, if the transaction is related to a user's payment, a user's payment preference, such as preferred funding source, a preferred percentage for tips, and the like, the cross-platform token may include these user preferences to customize the transaction. The tokens may not have monetary value, but may represent an underlying mapping to a metadata source that may be mapped by a cross-platform token vault.

The cross-platform token provider, such as PayPal, may implement various processes. In an embodiment, the cross-platform token provider may authenticate the user based on the token. The cross-platform token provider also may generate tokens based on the requirements of the transactions. In another embodiment, the cross-platform token provider may implement token management, such as register user, add, delete, or manage metadata related to a user's identity or information. Proprietary algorithms may be used for token assurance and/or risk management. The cross-platform token provider also may mange entities, such as merchants, that need access to the token or token metadata. The cross-platform token provider may define and implement frameworks for secure operation of the token. In still another embodiment, the cross-platform token provider may provide token service to users. In particular, the identity token provider may provide service for obtaining new tokens, validation, and metadata access for users or to enable seamless experiences for Internet of Things (IoT). User may be consumers, merchants, businesses, government entities, or any other entities or organizations that require or would benefit from user's information to complete various payment and non-payment service transactions. A secure mechanism may be provided for retrieving tokens, storing tokens in mobile apps and deciphering the stateless tokens in the backend to complete appropriate transactions and services. For example, symmetric encryption techniques may be used to store and/or communicate the tokens over existing secure channels such as SSL to add multiple layers of security.

In an embodiment, the system may use industry standard BINs or IINs and provide tokens as aliases to funding sources, customer identities and customer metadata together. These tokens may replace the use of actual funding source information and customer information, such as credit card and other user information that are sent online to a merchant for transaction processing. This may prevent any information from being compromised during transmission across payment networks and/or channels.

The cross-platform token service provider may provide tokenization services to payment networks, third party vendors, service providers, issuers, merchants, providers of a service and consumers. In an embodiment, the cross-platform token service provider may provide services for at least four different types of tokens. A static cross-platform token may be used during the creation of a payment card compatible for use with magnetic strip reader, near-field communication (NFC), or EMV chip. The static cross-platform token may be hardcoded with the payment card. A mobile cross-platform token may be used by mobile devices (wearable/non-wearable/smart) that are configured to run payment related applications for use in transactions via Near Field Communication (NFC), Bluetooth/Bluetooth Low Energy (BLE), Wifi, wi-di, QR Code and other mobile payment communication mediums. An encrypted cross-platform token may be cached for usage via mobile payment solutions when network connectivity is limited or not available. An online cross-platform token may be used for online payment transactions via web or mobile web on desktop browsers, mobile web browsers, tablet browsers, wearable device browsers and other web applications. The use of these tokens may replace the use of actual payment information, identity of the consumer or funding source information for secure transmission. This may reduce the risk of these private information from being compromised both online and offline. All of these tokens will also mask user identity and contain metadata that can be used for multitude of value added services. By using these tokens, the system may provide increased security, improved interoperability among different payment networks, enabling new and upcoming payment channels, and convenience for consumers.

By establishing the cross-platform token service, a payment service provider, such as PayPal, Inc., may serve as the manager of not only the users' payment transactions, but also other identity information of the users. As such, the users need not request tokens via a third party to obtain a token during transactions. Users of the payment service provider, such as PayPal users, who already process payments through the payment service provider, may now have all their payment information routed across channels via tokens as an alias to their payment information and identity. When this information is routed back to the cross-platform token service provider, the service provider may further enhance security by sharing the underlying funding instrument information with the payment networks via an industry standard unique third party token called the payment token without disclosing funding information. When the payment network learns of the underlying funding information via de-tokenization service from the industry standard third party token service provider, the payment network may share the same payment token without disclosing or opening the fund information to the issuer during transmission and processing. The cross-platform token service provider can further mask the user information but provided value added information for value added services, such as loyalty, health care, etc. without compromising the user identity while still providing relevant data. The above features may ensure a closed loop transmission of information to enhance security and integrity.

Additional details pertaining to the generation of tokens and their life cycle management are provided in the Appendix of the present disclosure.

Figure 5:
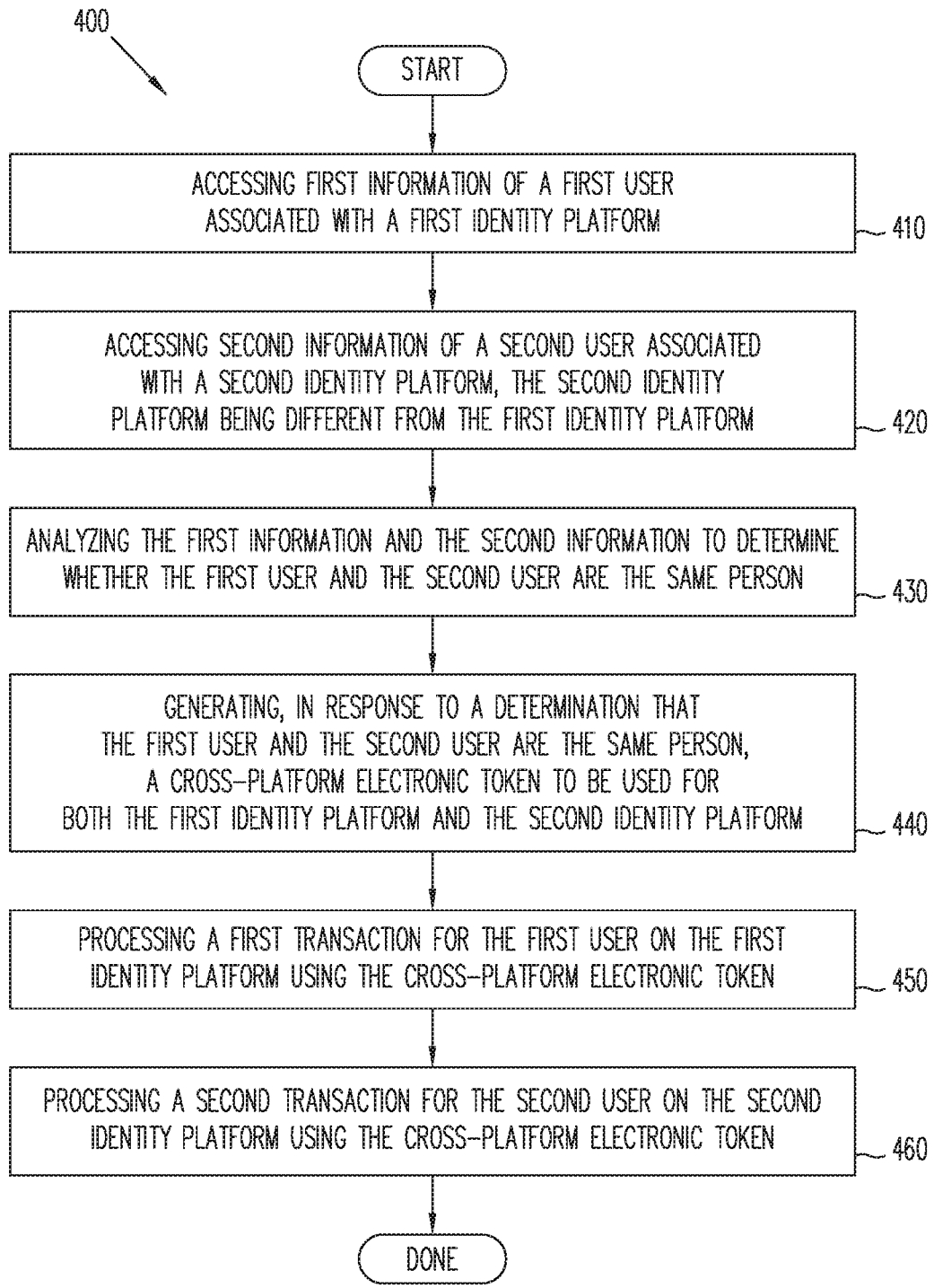
FIG. 5 is a flowchart of a method of generating cross-platform tokens according to various aspects of the present disclosure.

FIG. 5 is a flowchart illustrating a method 400 of generating a cross-platform token according to various aspects of the present disclosure. The method 400 includes a step 410 of accessing first information of a first user associated with a first identity platform.

The method 400 includes a step 420 of accessing second information of a second user associated with a second identity platform, the second identity platform being different from the first identity platform.

The method 400 includes a step 430 of analyzing the first information and the second information to determine whether the first user and the second user are the same person. In some embodiments, the analyzing comprises comparing the first information with the second information to identify areas of commonality.

The method 400 includes a step 440 of generating, in response to a determination that the first user and the second user are the same person, a cross-platform electronic token to be used for both the first identity platform and the second identity platform.

The method 400 includes a step 450 of processing a first transaction for the first user on the first identity platform using the cross-platform electronic token.

The method 400 includes a step 460 of processing a second transaction for the second user on the second identity platform using the same cross-platform electronic token.

In some embodiments, the first information or the second information comprises one or more of the following: username, funding instrument, domain of transaction, intent of transaction, residential address, shipping address, email address, phone number, employer, occupation, birthdate, birth place, citizenship, age, credit score, credit history, school attended, relatives, hobbies.

In some embodiments, the first information or the second information comprises biometric information of the first user or the second user, respectively.

In some embodiments, the accessing steps 410 or 420 comprises receiving the first information and the second information from an electronic device of the first user or the second user, respectively. In some embodiments, the first information or the second information comprises one or more of the following: an IP (Internet Protocol) address of the electronic device, a MAC (Media Access Control) address of the electronic device, a UUID (Universally Unique Identifier) of the electronic device, a UDID (Unique Device Identifier) of the electronic device, a screen resolution of the electronic device, or an Internet browser type used to communicate the first or second information.

In some embodiments, at least one of the first identity platform and the second identity platform comprises a social network or an online marketplace.

It is understood that at least some of the steps 410-460 are performed at least in part by one or more electronic processors of a system that is located remotely from the mobile electronic device. It is also understood that additional method steps may be performed before, during, or after the steps 410-460 discussed above. It is also understood that one or more of the steps of the method 400 described herein may be omitted, combined, or performed in a different sequence as desired.

The optimized cross-platform tokenization scheme of the present disclosure offers various advantages over conventional tokenization schemes. It is understood, however, that not all advantages are necessarily disclosed herein, different embodiments may offer different advantages, and that no particular advantage is required for all embodiments.

One advantage is effective economics. Since the tokens work for multiple identity platforms, cost of token generation is reduced. In addition, for identity platforms that offer reward points (or loyalty points) for its users, for example a department store that has either a physical marketplace or a virtual marketplace, the cross-platform (or platform-agnostic) token herein does not prevent the user from earning the reward points. Another advantage is that it is compatible with the existing ecosystem/infrastructure. The cross-platform tokenization disclosed herein is interoperable with existing payment providers, payment networks, and identity platforms and offers familiarity to their users and operators. The interoperability with existing infrastructure also means that the cross-platform tokenization disclosed herein can be easily implemented and quickly adopted.

Figure 6:
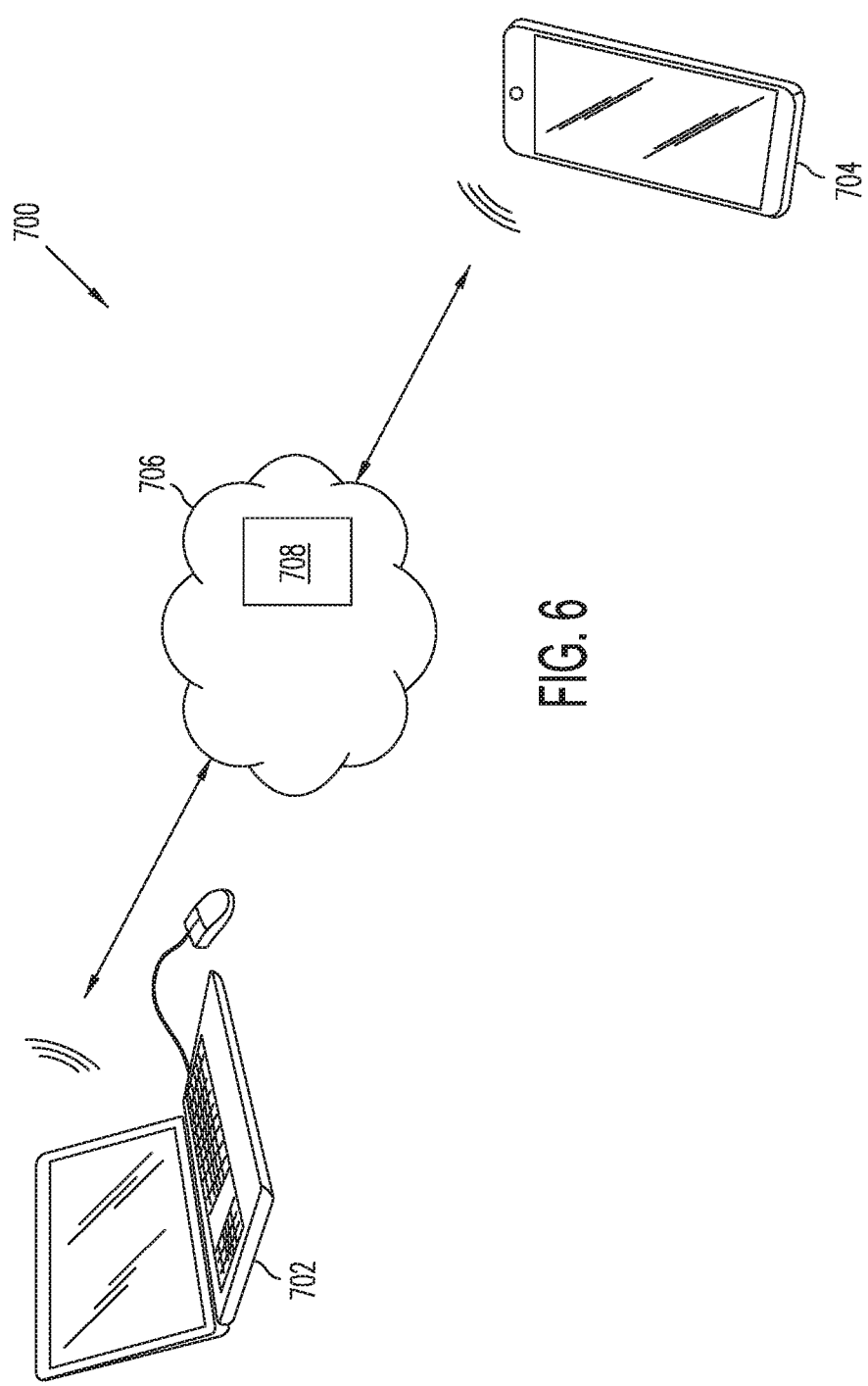
FIG. 6 is a diagram illustrating an example cloud computing architecture according to various aspects of the present disclosure.

FIG. 6 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to access identity platforms and initiate purchasing transactions therethrough.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

Figure 7:
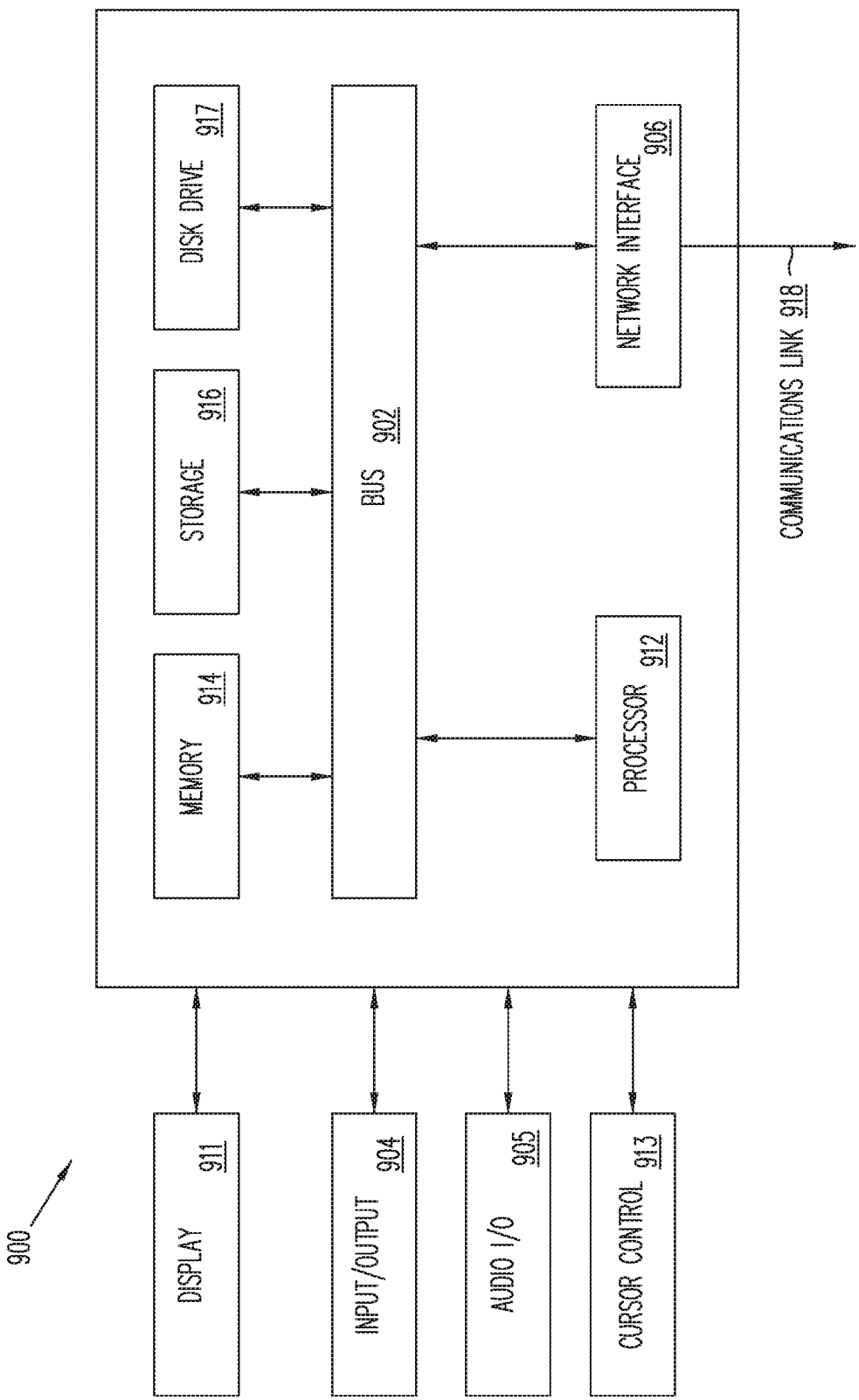
FIG. 7 is a block diagram of a computer system suitable for implementing one or more components in FIG. 1 according to various aspects of the present disclosure.

FIG. 7 is a block diagram of a computer system 900 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant server, or a payment provider server via network 360. In one embodiment, the transmission is wireless, although other transmission mediums and methods may also be suitable. A processor 912, which can be a micro-controller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including tele-communications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

One aspect of the present disclosure involves a system. The system includes an electronic memory storing programming instructions; and one or more electronic processors in communication with the electronic memory. The one or more electronic processors are configured to execute the programming instructions to perform the following steps: accessing first information of a first user associated with a first identity platform; accessing second information of a second user associated with a second identity platform, the second identity platform being different from the first identity platform; analyzing the first information and the second information to determine whether the first user and the second user are the same person; and generating, in response to a determination that the first user and the second user are the same person, a cross-platform electronic token to be used for both the first identity platform and the second identity platform.

Another aspect of the present disclosure involves a tokenization method. The method includes: accessing first information of a first user associated with a first identity platform; accessing second information of a second user associated with a second identity platform, the second identity platform being different from the first identity platform; analyzing the first information and the second information to determine whether the first user and the second user are the same person; and generating, in response to a determination that the first user and the second user are the same person, a cross-platform electronic token to be used for both the first identity platform and the second identity platform.

Yet another aspect of the present disclosure involves a non-transitory computer-readable medium comprising instructions which, in response to execution by a computer system, cause the computer system to perform a method comprising the following steps: accessing first information of a first user associated with a first identity platform; accessing second information of a second user associated with a second identity platform, the second identity platform being different from the first identity platform; analyzing the first information and the second information to determine whether the first user and the second user are the same person; and generating, in response to a determination that the first user and the second user are the same person, a cross-platform electronic token to be used for both the first identity platform and the second identity platform.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

Appendix

Issuance and lifecycle management of Access Instruments : These include, but are not limited to cards, Mobile payments and Online Token products. An access instrument is any type of entity, typically tokens with or without a form factor, that gives a customer the ability to access their funding instrument over arbitrary networks. There are examples of tokens that route over payment provider networks given to customers accessing merchants. Tokenization provides payment flexibility using payment provider as a set of cloud services providing the network and processing capability. This is done through the issuance of a card number that can route over traditional card networks where a merchant has an already established integration. These tokens can happen through online payments, they can be embossed on a card, giving customers a way to pay at a POS terminal, or they can be provisioned on a mobile NFC capable device.

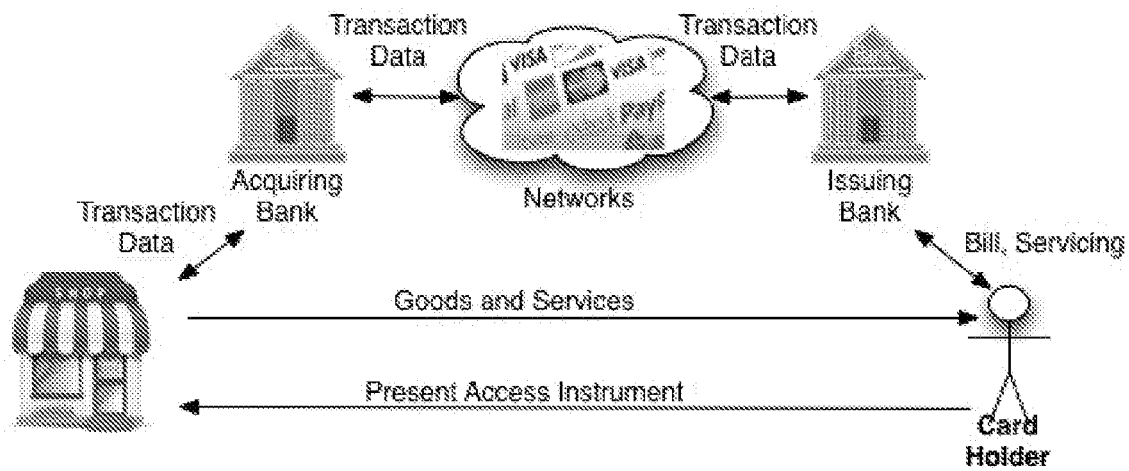

The picture above provides a basic view of a payment network. Payment provider serves as the issuing bank for their customers allowing them to shop at arbitrary merchants. Depending on the capability of the merchant, the right kind of access instrument can be presented to get the payment back into payment provider for payment processing.

Issuance does not support all aspects of the Access Instrument capability, for example fulfilling an authorization, handling the settlement or providing the use experience are handled by other teams that provide and support this capability generically.

ACCESS INSTRUMENTS

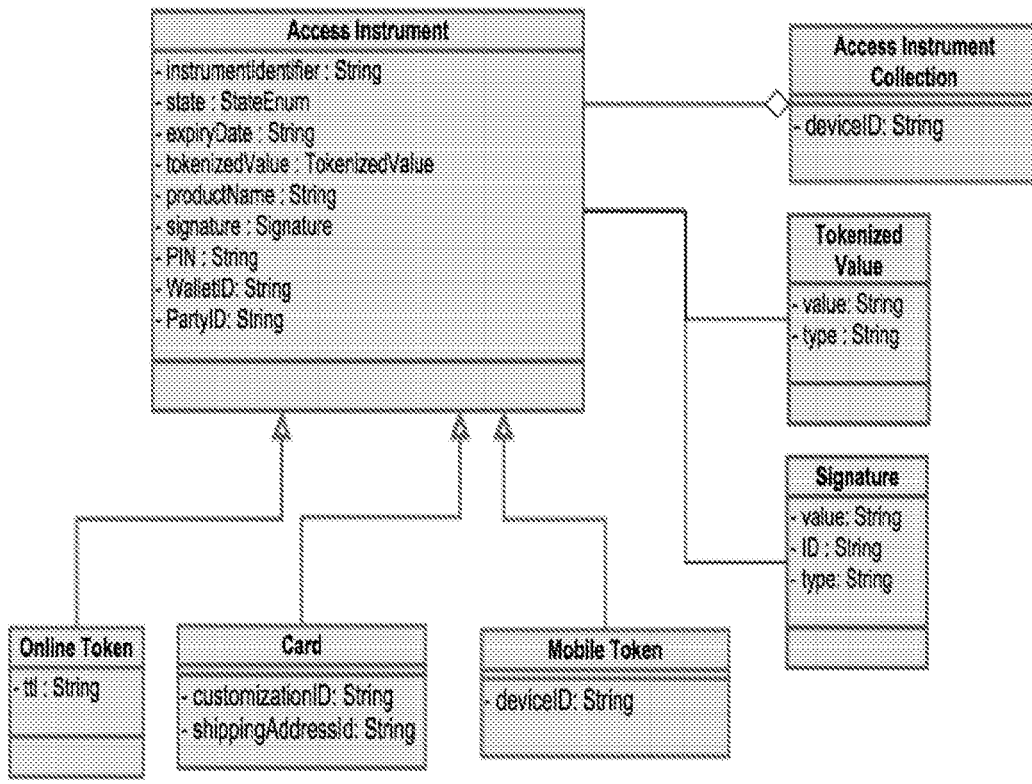

One goal is to provide an issuance platform, capable of issuing any type of device that fits under the broad category of a customer access to their funding instrument. Access Instrument is the abstraction of what issuance manages. This basic class diagram describes Access Instruments as the base class providing the basic capability required by most access devices. The instrumentIdentifier will typically be the card number. It will have state and an expiration date, etc.

DOMAIN MODEL

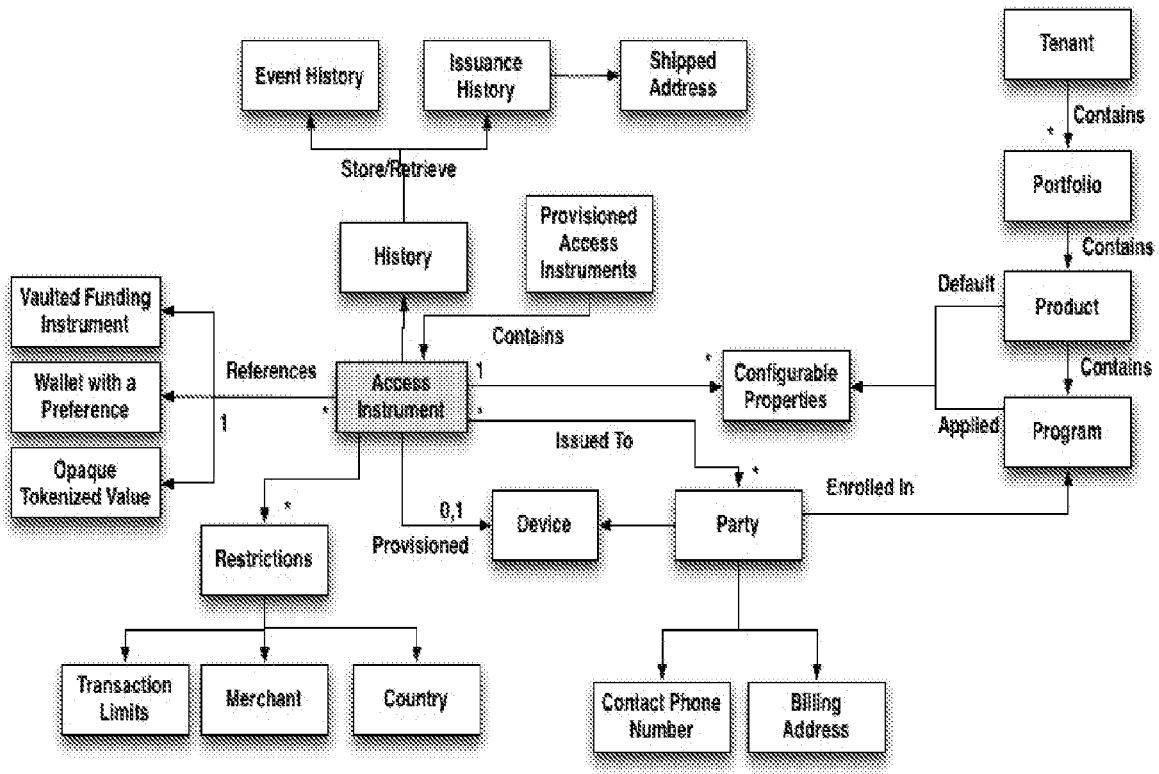

The Access Instrument entity is at the center of the issuance platform universe. One point of clarification, issuance has the theoretical potential to issue anything, but the platform only manages the lifecycle of access instruments. A third party payment provider can bring up payment transactions, vault instruments into wallets, enroll customers into reward programs, but the third party payment provider owns the System of Records for the tokens, cards and mobile wallets that give customers the ability to pay on arbitrary networks.

History

Access instruments have a history, a history of lifecycle events is recorded, including creation, activation, close and lost/stolen. The issuance history is also recorded to track every time the expiration date is updated for the card number, resulting in another shipped card or embossed mobile device.

Party

Access instruments are given to people with a billing address, contact numbers, names. Cards are not shipped to accounts, but to people. It's possible that the person is someone who isn't an account holder of the payment provider officially but has permission to access someone else's wallet through the access device we issue.

Properties

Every type of Access Instrument has a set of configurable properties. The meta-data describes the instrument, its limitations, and benefits. These are managed within the PCE. The default properties can be overridden by certain programs given to a subset of customers or by a certain tenant, etc.

Restrictions

We may want to impose restrictions on specific Access Instruments. They can only be used in certain channels, they have transaction limits or have only certain countries that support them.

Value to Tokenize

Access Instruments access something, typically payment provider wallets or funding instruments, but it could really be anything. Every token, wallet or card may have something in the tokenized_value field. This will always be the most granular piece of data possible. For example, if something is tokenized inside the wallet, that something will be in the tokenized-value field. Likely, we'll also want and possibly return the wallet id to our clients as well. In some cases, there will be a reference to the wallet id as a separate field. This will allow queries. This query will include tokens tokenized against things inside that wallet.

PRINCIPLES

| Principle | Description |
| --- | --- |
| Federated | <ul><li>Multi-Tenant – Multi-Constituent</li><li>The platform should be designed to allow for high-velocity integration of a range of external components, services and capabilities</li></ul> |
| Decoupled | <ul><li>Dependencies on external components should be loosely coupled by using industry standard interfaces</li></ul> |
| Simple | <ul><li>The system is designed as a collection of loosely coupled components</li><li>An individual component is an internal/external infrastructure service or a module that encapsulates a set of related functions or data</li></ul> |

| Principle | Description |
|---|---|
| | • Only components strictly related to the core functionality should be internal<br>• Simplified external integrations |
| Configurable | • Dynamic configurability to minimize planned downtime<br>• A mechanism should be designed to allow for consistent and simple distribution of configuration data into multiple components |
| Available | • De-Tokenization<br>  • Switch level performance,<br>  • Horizontally scalable<br>  • Tier 1 (CA): 99.999% + Availability<br>  • Response time should be at par or exceed the industry standard<br>• Issuance Management Components<br>  • Tier 3 (SA): 99.9% + Availability |
| Scalable | |
| Monitored | Metered, Audited, Segregated by Tenant System |
| Stand-In | • Authorizations may be routed to payment provider as long as there is a functional connection between the switch/third-party-service-provider.<br>• Limits stored at switch or third party provider should be only used during stand-in authorizations. |

ISSUANCE CAPABILITIES

| Component | Capabilities |
|---|---|
| Onboarding | <ul><li>Qualification for issued products</li><li>Orchestrate fulfillment and links into other subsystems</li><li>Integration with risk and compliance</li></ul> |
| Management | <ul><li>PAN/Token number generation<ul><li>Wallet</li><li>FI</li></ul></li><li>Expiration date management</li><li>Token time to live management</li><li>State lifecycle management</li><li>Reconciliation System</li></ul> |
| Infrastructure | <ul><li>Enterprise component adapters</li><li>Event logging</li><li>Configuration engine support</li><li>Customer communication manager<ul><li>eCAT</li><li>State management (did the e-mail get sent)</li><li>Templates and dynamic data</li></ul></li></ul> |

| Component | Capabilities |
|---|---|
| Fulfillment<br>• External fulfillment adapter, batch<br>• External fulfillment adapter, real-time<br>• Wallet Fulfillment adapter | • Emboss (mail card)<br>• Inject tokens into phones<br>• Issue FI into wallet<br>• Issue FI into external wallet (via API) |
| Batch Management | • System triggered notification<br>• Monthly reissue<br>• Bulk Issue<br>• Bulk cancellation |
| Validation and De-Tokenization | • De-Tokenize to wallets<br>• Validation<br>• e.g. Expiry date validation<br>• e.g. Token Time To Live check (state mgmt.)<br>• Operates at switch level availability |

ISSUANCE COMPONENTS AND CONTEXT

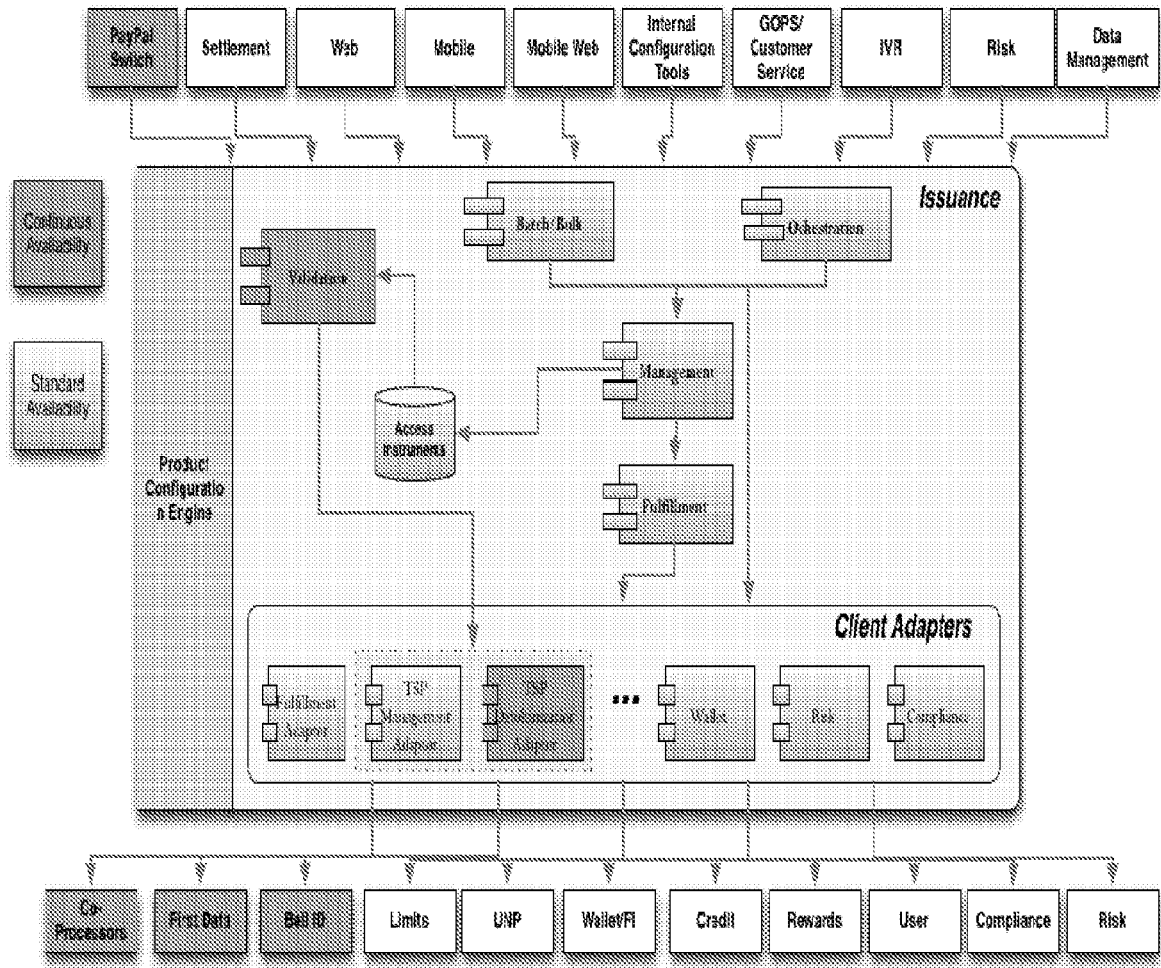

A summary of the main components:

1. Management: Provides basic product lifecycle capability such as creation, updates and deletion. Owns the system of record for issuance managed products.

2. Orchestration: Provides the issuance views for outside clients to call into our platform. Orchestrates across services.

3. Validation: Provides de-tokenization and validation capability.

4. Fulfillment: An optional component that manages form factors for certain access instruments, such as provision a phone or emboss a card.

5. Batch/Bulk: Capability to do certain pieces of the capability typically performed by orchestration but in bulk. An example is to mass issue cards to a large number of people.

6. Product Configuration Engine: Provide a capability to configure the product meta-data.

CONTEXT DIAGRAMS

The following two component diagrams describe the different components that are involved in managing Cards at payment provider.

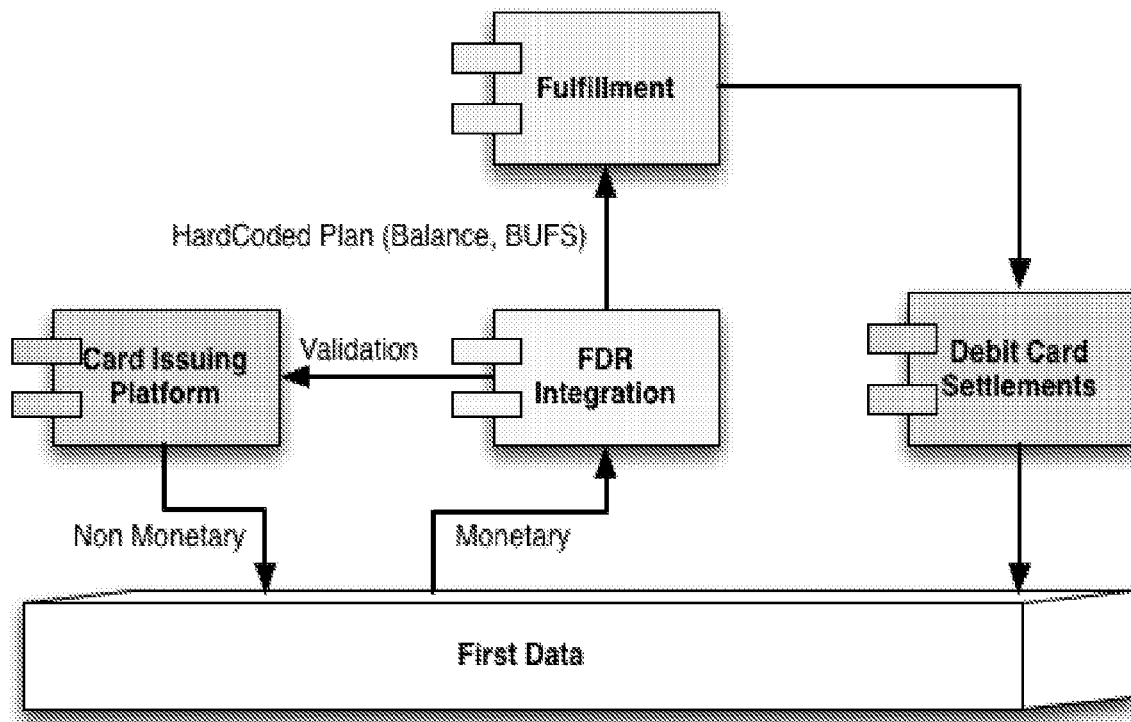

With Debit Cards, either the Mastercard signature networks or the Pulse/Star PIN networks integrated through First Data can be used as payment processing partner. FDR has an ISO8583 monetary integration with us that is currently managed by the Vendor Integration (VI) team (they own the light green component above).

To process a payment:

1. FDR receives it off the card network, performs certain risk rules and validates the magnetic stripe data (cvv, card state, expiration date, etc.), then passes the card information up to payment provider over an ISO8583 messaging protocol.

2. VI handles this integration. Asks the Card Issuing Platform (FinProd) to verify the card state yet again.

3. Once this is verified, a psuedo-planning step is taking. Since it's debit, the plan is balance with a BUFS (payment provider credit or bank). This plan is passed to fulfillment (money) to authorize the payment.

4. Later the funds are settled by a batch managed by the Settlement team. This settlement batch is different from typical settlement batches managed by payment provider because funds are settled between us and the payment processor which ultimately need to settle the funds with the merchant acquiring bank.

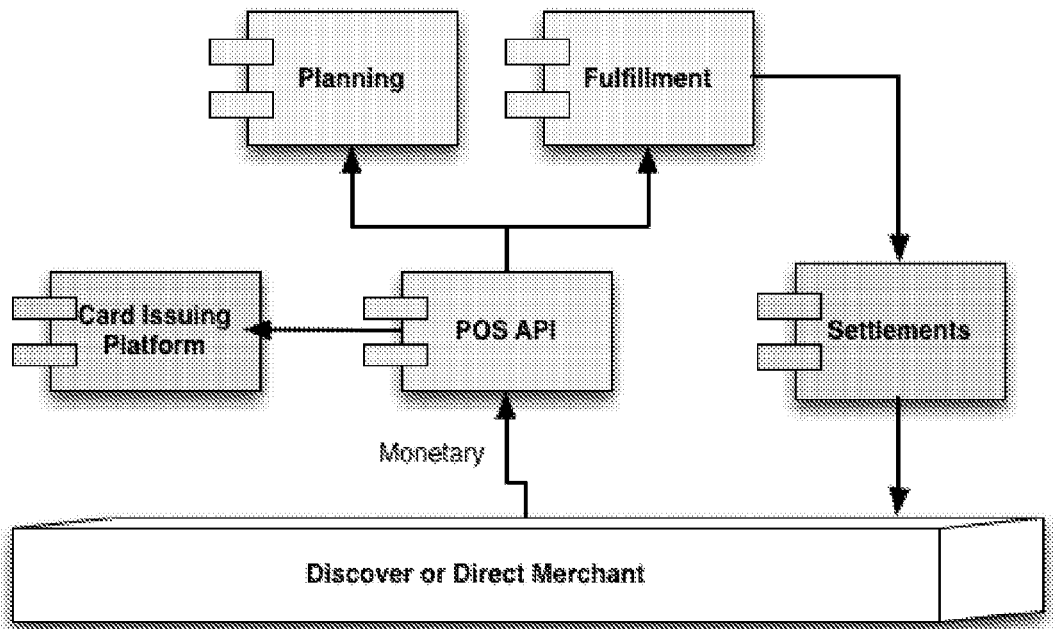

5. The Card platform currently only manages one other "type" of card aside from the debit, and that is the Davis card. The component diagram is similar. However the ownership changes slightly. Here the POS team manages external API's that are integrated with Discover or to merchants directly. These calls are SOAP based and do not conform to ISO8583 standards. They still call the CIP domain for card validation.

This card fronts the wallet and so must accesses the entire wallet and must go through traditional planning before authorizing the payment.

DEPLOYMENT
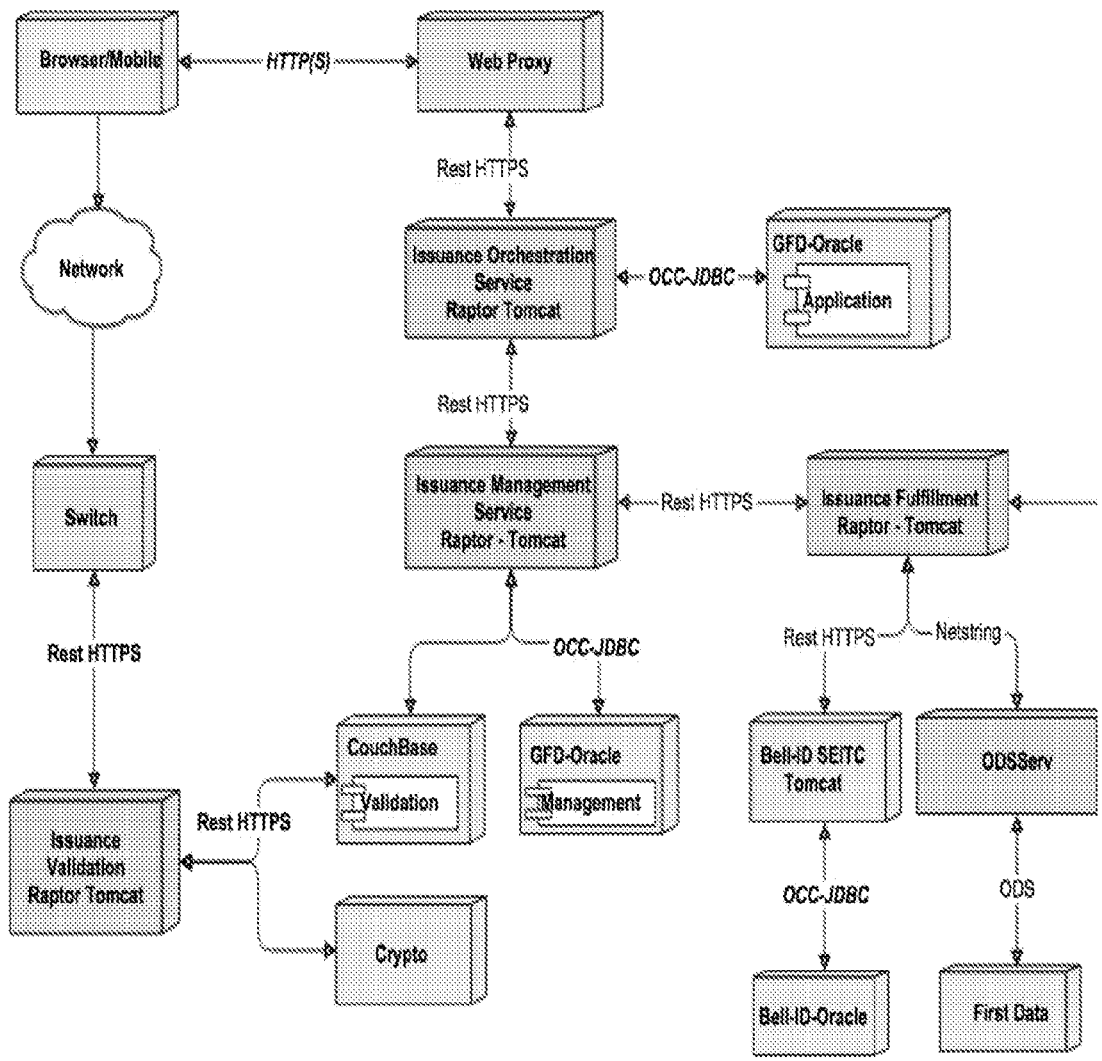
- This diagram is missing batches and daemons.

- The purple components are managed by issuance.
- The peach components are internal to payment provider dependencies.
- The green components are third party provided dependencies. Bell-ID components are managed in our data centers.

SOME NOTES ON VALIDATION

Of the services of the payment provider, validation is the only one in the payment path, so as such needs to finish with very fast response times at scale.

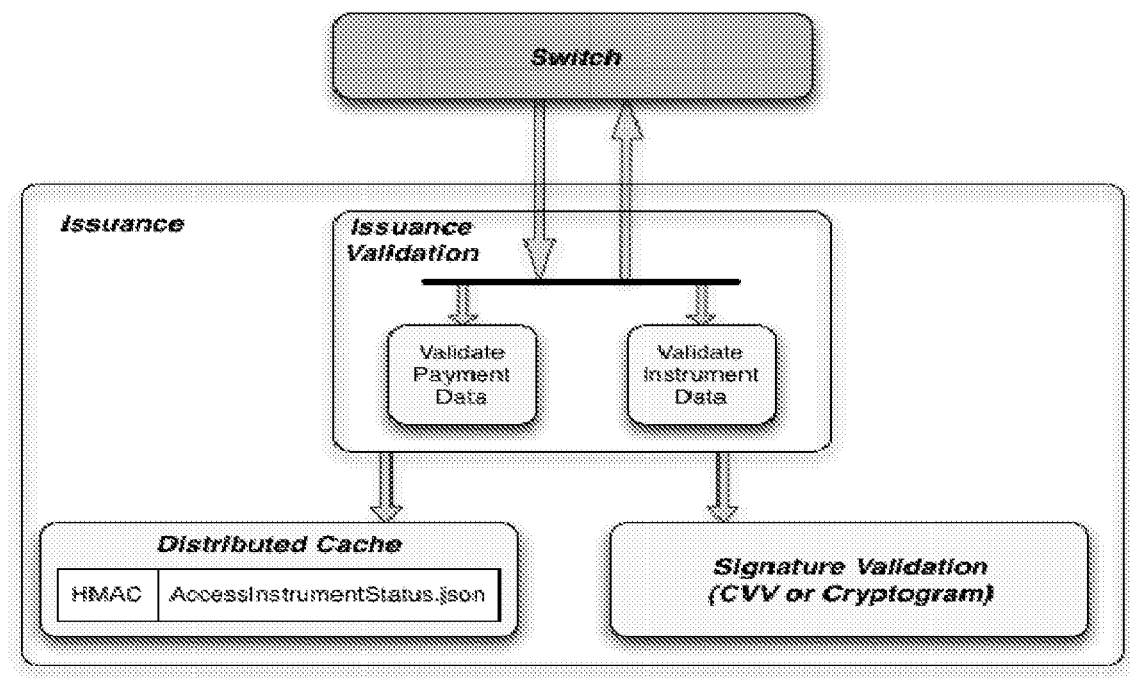

An activity diagram is here:

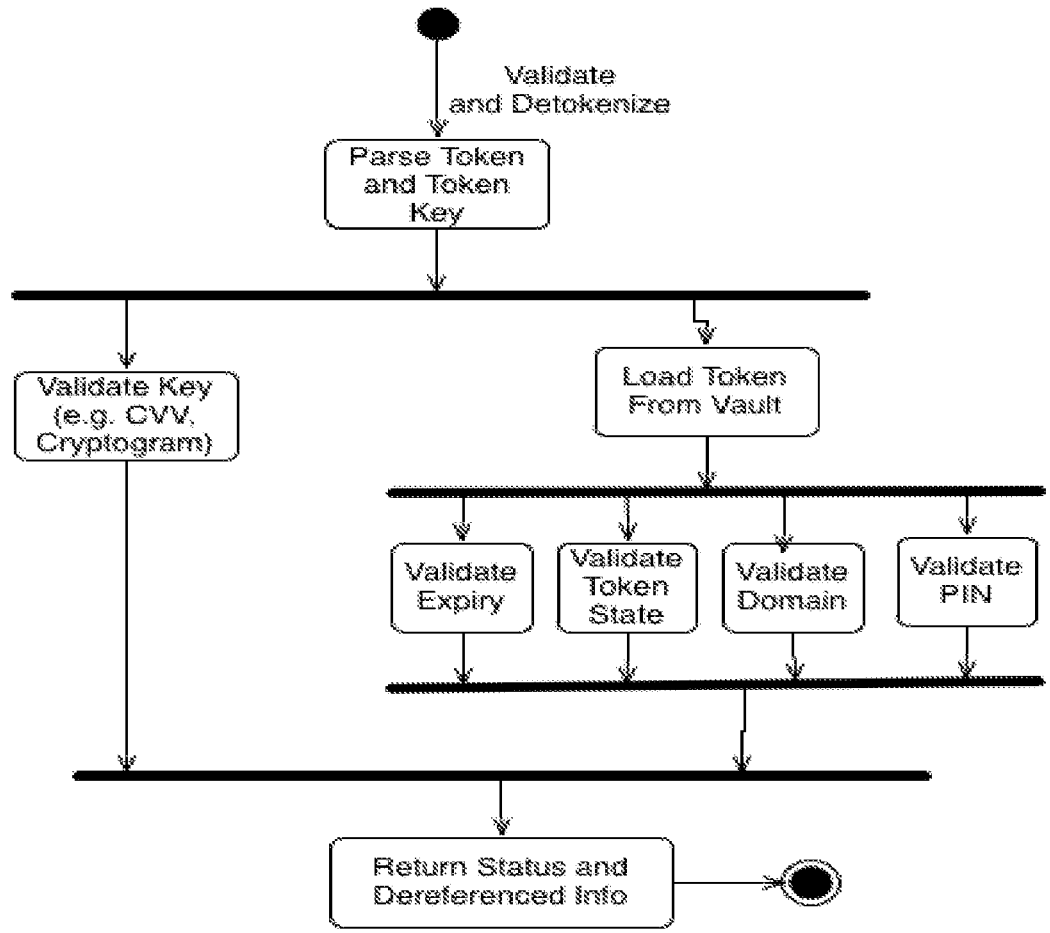

There are two objectives here. One is to perform validation and de-tokenization as two completely independent processes that can be done in parallel. The second is to store the HMAC(PAN) map to the de-tokenization data in a cache data store that can be de-tokenized quickly and accurately.

SOME NOTES ON ORCHESTRATION

An interface layer is provided. Client requests go through this this interface layer. The Issuance Orchestration Service will provide this capability.

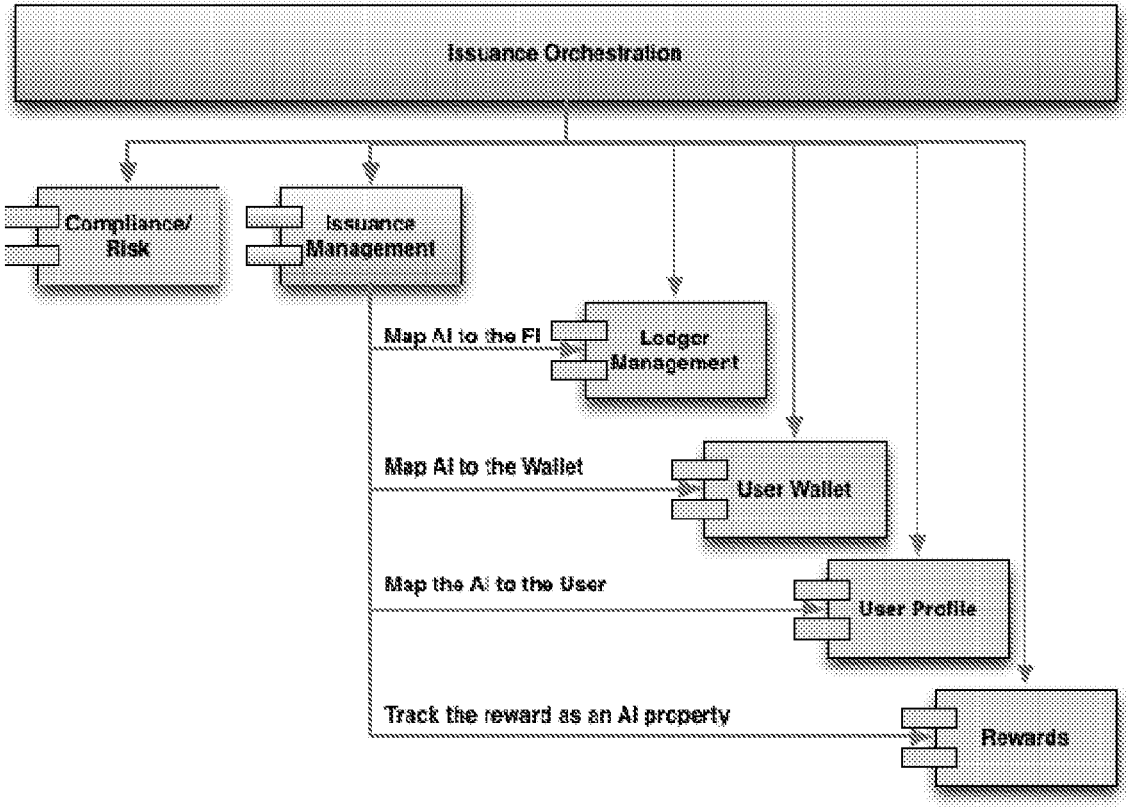

Issuance Orchestration, then, has the following responsibilities:

1. Provide the RESTful API's for all of our clients.

2. Enforce security. Only clients with the proper credentials are allowed into issuance.

3. Provide a way to manage variations of orchestration across domains.

a. Limit business logic within this service, rely on external services.

b. Provide an application/onboarding capability, which is primarily an orchestration across compliance and risk.

The following activity diagram gives an example of a typical orchestration flow. Note, there is a call to compliance and risk up front to determine application status. If approved, there are various activities to orchestrate to get the card to the user with the proper rewards, limits, funding preference properties in place.

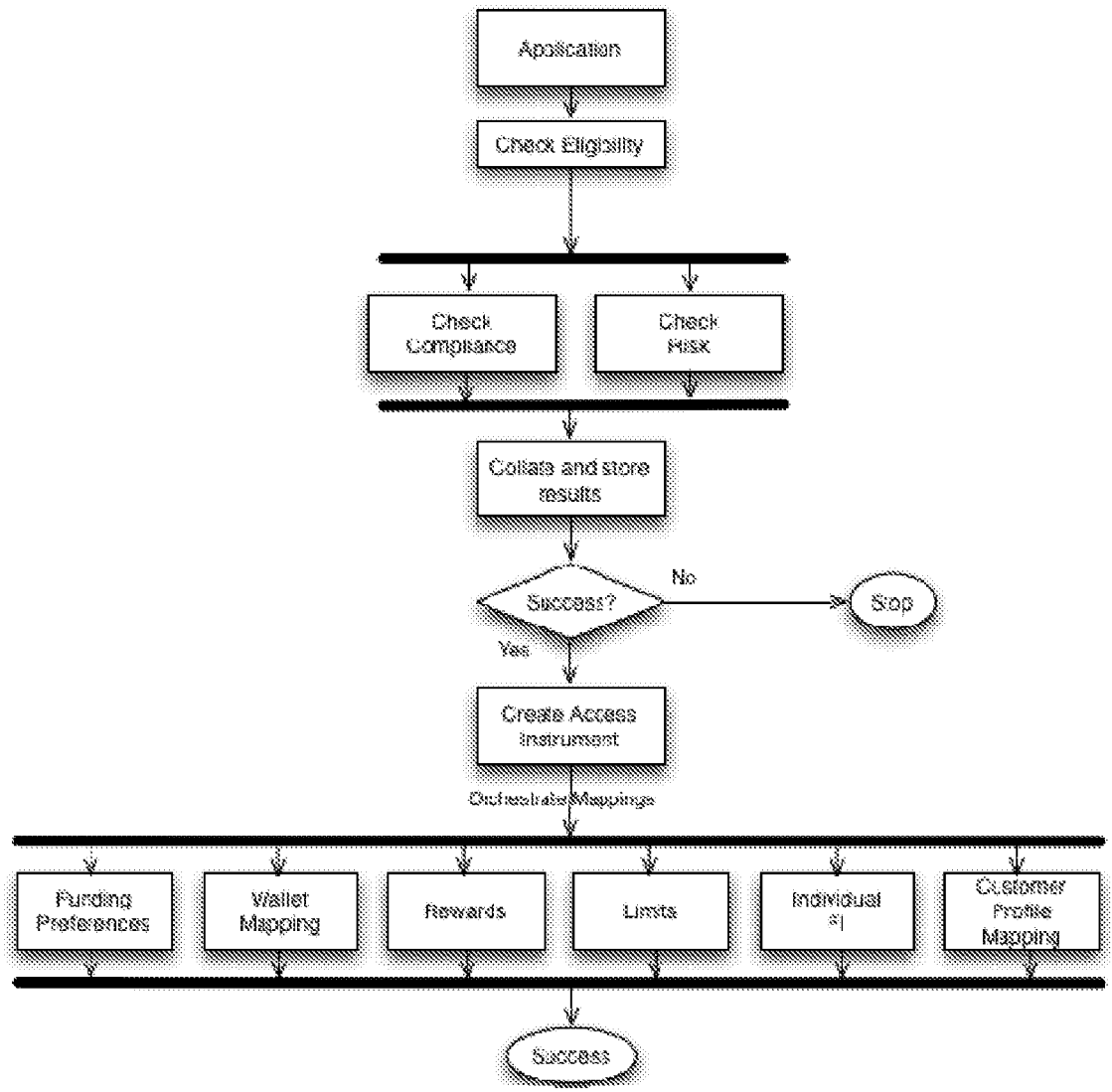

*Debit Card Issuance Flow Diagram*

There is one more view with issuance orchestration. It may be an orchestration service. There will be a limited need for business logic. Some of the onboarding burden will be carried by risk and compliance, thought there will be eligibility and product checks done within IOS. IOS will also perform the additional orchestration to set up the product within payment provider.

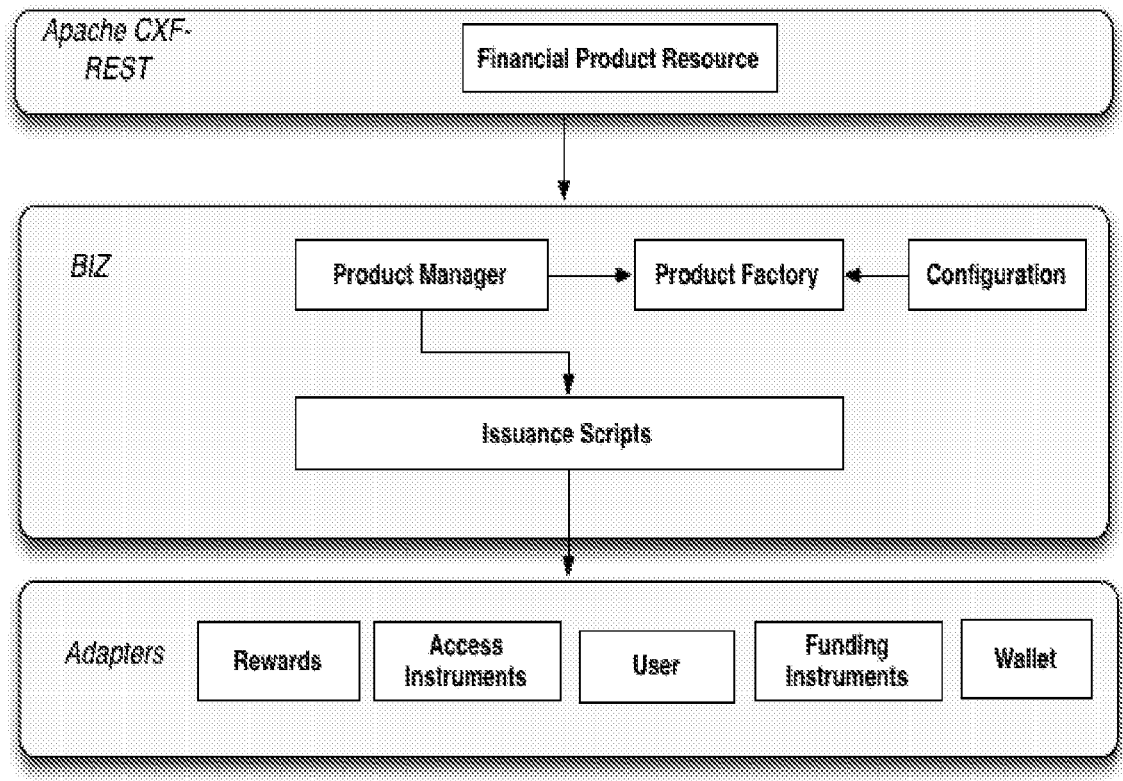

SOME NOTES ON MANAGEMENT

Management should basically do the same thing for products (Access Instruments) captured in core business objects. There may be slight orchestration changes from product-to-product for various operations: create, activate, close, replace, etc. These variations will be minimized. To account for the variations, an operation script can be loaded based on product with the right business objects injected into the script. This architecture design is documented in the figure below.

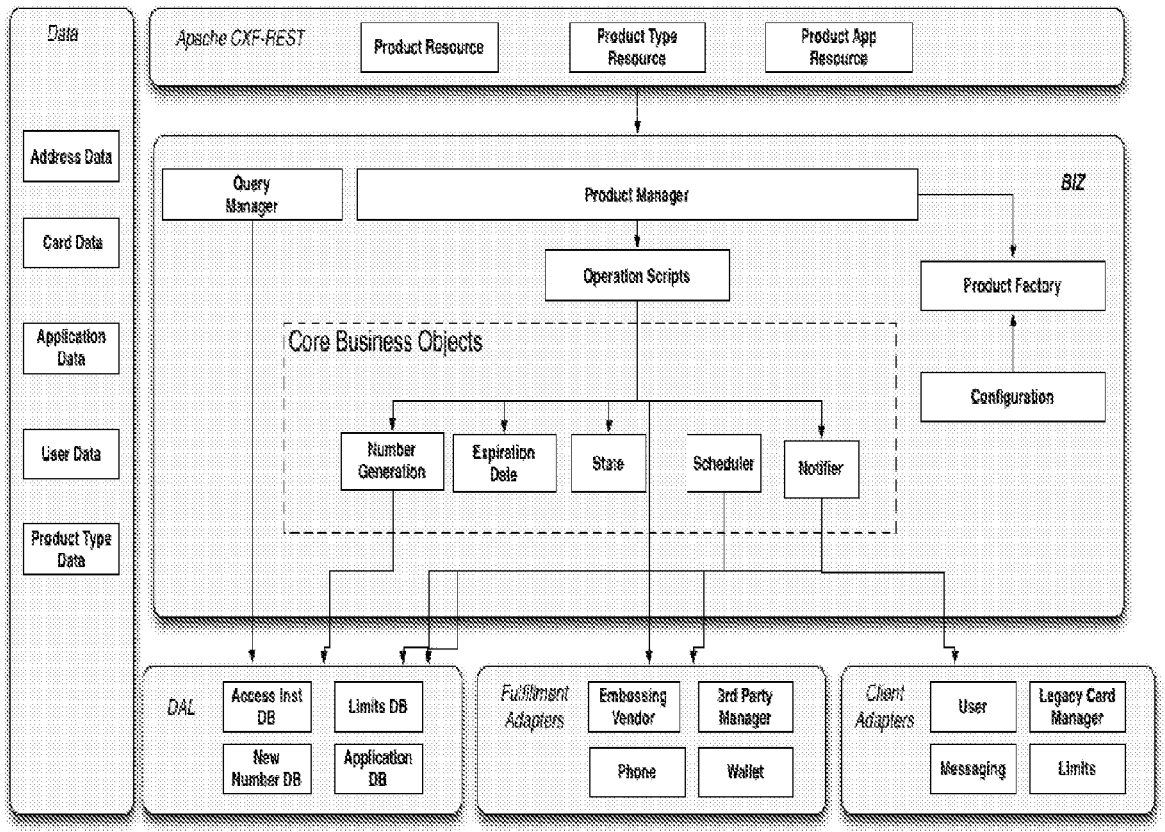
SOME NOTES ON FULFILLMENT
The fulfillment service allows complicated integrations to be plugged in with third party vendors without complicating IMS. It will accept request to fulfill request with a third party, primarily requests to provision a phone or emboss a card. This service can handle the details of doing so.

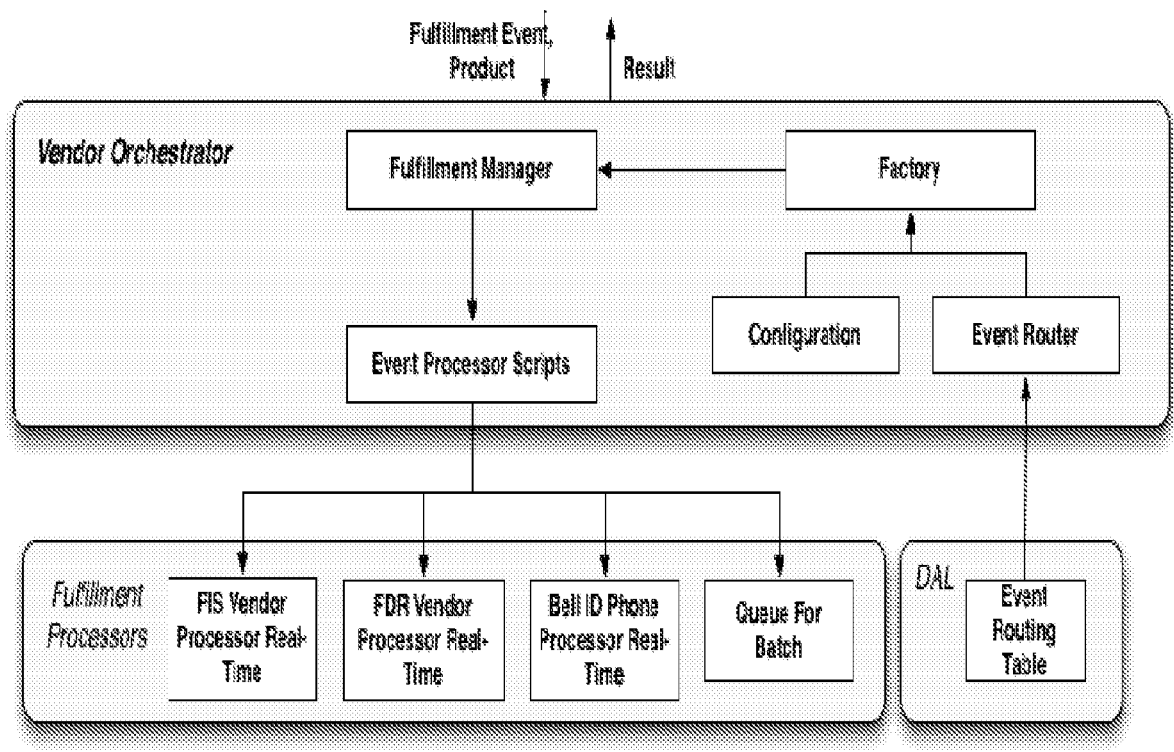

What is claimed is:

1. A system of electronic token processing, the system comprising:
a non-transitory memory; and
one or more hardware processors coupled to the non-transitory memory and configured to read instructions from the non-transitory memory to perform operations comprising:
accessing first information of a first user associated with a first identity platform that maintains user identities for a first set of users, the first identity platform having a first payment token associated with the first user, the first identity platform being a different entity than the system of electronic token processing, the first information comprising first biometric information;
accessing second information of a second user associated with a second identity platform, the second identity platform being different from the first identity platform and maintains user identities for a second set of users, the second identity platform having a second payment token associated with the second user, the second identity platform being a different entity than the system of electronic token processing, the second information comprising second biometric information;
comparing the first information with the second information at least in part by comparing the first biometric information with the second biometric information;
determining, based on the comparing the first information with the second information, that the first user and the second user are the same;
generating, in response to the determining, a cross-platform electronic payment token, wherein the cross-platform electronic payment token comprises a plurality of digits generated from a random number and represents a proxy for a payment instrument;
sending the cross-platform electronic payment token to the first identity platform to replace the first payment token;
sending the cross-platform electronic payment token to the second identity platform to replace the second payment token; and
blacklisting the first payment token and the second payment token.

2. The system of claim 1, wherein the operations further comprise:
processing a first transaction for the first user on the first identity platform; and
processing a second transaction for the second user on the second identity platform, wherein the processing of the first transaction and the processing of the second transaction are each performed using the same cross-platform electronic payment token.

3. The system of claim 1, wherein the operations further comprise calculating an overall match score between the first information and the second information, the overall match score being a function of areas of commonality between the first information and the second information, and wherein the determining is further based on the overall match score.

4. The system of claim 1, wherein the first information or the second information further comprises one or more of the following: a username, a funding instrument, a domain of transaction, an intent of transaction, a residential address, a shipping address, an email address, a phone number, an employer, an occupation, a birthdate, a birth place, a citizenship, an age, a credit score, a credit history, a school attended, a relative, or a hobby.

5. The system of claim 1, wherein the operations further comprise: after the blacklisting, rejecting a transaction that involves the first payment token on the first identity platform or a transaction that involves the second payment token on the second identity platform.

6. The system of claim 1, wherein:
the first information or the second information comprises one or more of: an IP (Internet Protocol) address, a MAC (Media Access Control) address, a UUID (Universally Unique Identifier), a UDID (Unique Device Identifier), a screen resolution, or an Internet browser type used to communicate the first information.

7. The system of claim 1, wherein at least one of the first identity platform or the second identity platform comprises a social network or an online marketplace.

8. A tokenization method, comprising:
accessing, by an electronic token processing system, first information of a first user associated with a first identity platform that manages user identities for a first group of users, the first identity platform having a first payment token associated with the first user, the first identity platform and the electronic token processing system operating different servers, the first information comprising first biometric information;
accessing, by the electronic token processing system, second information of a second user associated with a second identity platform that manages user identities for a second group of users, the second identity platform being different from the first identity platform, the second identity platform having a second payment token associated with the second user, the second identity platform and the electronic token processing system operating different servers, the second information comprising second biometric information;
comparing, by the electronic token processing system, the first information with the second information at least in part by comparing the first biometric information with the second biometric information;
determining, by the electronic token processing system and based on the comparing the first information with the second information, that the first user and the second user are the same;
generating, by the electronic token processing system in response to the determining, a cross-platform electronic payment token, wherein the cross-platform electronic payment token comprises a plurality of digits generated from a random number and represents a proxy for a payment instrument;
sending, by the electronic token processing system, the cross-platform electronic payment token to the first identity platform to replace the first payment token;
sending, by the electronic token processing system, the cross-platform electronic payment token to the second identity platform to replace the second payment token; and
blacklisting, by the electronic token processing system, the first payment token and the second payment token.

9. The tokenization method of claim 8, further comprising:
processing, by the electronic token processing system, a first transaction for the first user on the first identity platform; and
processing, by the electronic token processing system, a second transaction for the second user on the second identity platform, wherein the processing of the first transaction and the processing of the second transaction are each performed using the same cross-platform electronic payment token.

10. The tokenization method of claim 8, further comprising
calculating, by the electronic token processing system, an overall match score between the first information and the second information, the overall match score being a function of areas of commonality between the first information and the second information, and wherein the determining is further based on the overall match score.

11. The tokenization method of claim 8, wherein the first information or the second information further comprises one or more of the following: a username, a funding instrument, a domain of transaction, an intent of transaction, a residential address, a shipping address, an email address, a phone number, an employer, an occupation, a birthdate, a birth place, a citizenship, an age, a credit score, a credit history, a school attended, a relative, or a hobby.

12. The tokenization method of claim 8, further comprising:
after the blacklisting, rejecting, by the electronic token processing system, a transaction that involves the first payment token on the first identity platform or a transaction that involves the second payment token on the second identity platform.

13. The tokenization method of claim 8, wherein:
the first information or the second information comprises one or more of: an IP (Internet Protocol) address, a MAC (Media Access Control) address, a UUID (Universally Unique Identifier), a UDID (Unique Device Identifier), a screen resolution, or an Internet browser type used to communicate the first information.

14. The tokenization method of claim 8, wherein at least one of the first identity platform or the second identity platform comprises a social network or an online marketplace.

15. A non-transitory computer-readable medium having stored thereon machine-readable instructions executable to cause a machine to perform operations comprising:
accessing first information of a first user associated with a first identity platform, the first identity platform having a first payment token associated with the first user, the first information comprising first biometric information;
accessing second information of a second user associated with a second identity platform, the second identity platform and the first identity platform managing different sets of user identities, the second identity platform having a second payment token associated with the second user, the second information comprising second biometric information;
comparing the first information with the second information at least in part by comparing the first biometric information with the second biometric information;
determining, based on the comparing the first information with the second information, that the first user and the second user are the same;
generating, in response to the determining, a cross-platform electronic payment token, wherein the cross-platform electronic payment token comprises a plurality of digits generated from a random number and represents a proxy for a payment instrument;
sending the cross-platform electronic payment token to the first identity platform to replace the first payment token;
sending the cross-platform electronic payment token to the second identity platform to replace the second payment token; and
blacklisting the first payment token and the second payment token;
wherein the accessing the first information, the accessing the second information, the comparing, the determining, the generating the cross-platform electronic payment token, the sending the cross-platform electronic payment token to the first identity platform, the sending the cross-platform electronic payment token to the second identity platform, and the blacklisting are performed by an electronic token processing system that is different from the first identity platform and the second identity platform.

16. The non-transitory computer-readable medium of claim 15, wherein the operations further comprise:
processing a first transaction for the first user on the first identity platform; and
processing a second transaction for the second user on the second identity platform, wherein the processing of the first transaction and the processing of the second transaction are each performed using the same cross-platform electronic payment token.

17. The non-transitory computer-readable medium of claim 15, wherein the operations further comprise calculating an overall match score between the first information and the second information, the overall match score being a function of areas of commonality between the first information and the second information, and wherein the determining is further based on the overall match score.

18. The non-transitory computer-readable medium of claim 15, wherein the first information or the second information further comprises one or more of the following: a username, a funding instrument, a domain of transaction, an intent of transaction, a residential address, a shipping address, an email address, a phone number, an employer, an occupation, a birthdate, a birth place, a citizenship, an age, a credit score, a credit history, a school attended, a relative, or a hobby.

19. The non-transitory computer-readable medium of claim 15, wherein:
the first information or the second information comprises one or more of: an IP (Internet Protocol) address, a MAC (Media Access Control) address, a UUID (Universally Unique Identifier), a UDID (Unique Device Identifier), a screen resolution, or an Internet browser type used to communicate the first information.

20. The non-transitory computer-readable medium of claim 15, wherein at least one of the first identity platform or the second identity platform comprises a social network or an online marketplace.

\* \* \* \* \*